(12) United States Patent
Shimizu

(10) Patent No.: US 10,459,775 B2
(45) Date of Patent: Oct. 29, 2019

(54) INFORMATION PROCESSING APPARATUS, METHOD, AND MEDIUM

(71) Applicant: CANON KABUSHIKI KAISHA, Tokyo (JP)

(72) Inventor: Yasutomo Shimizu, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/751,948

(22) PCT Filed: Oct. 18, 2016

(86) PCT No.: PCT/JP2016/080822
§ 371 (c)(1),
(2) Date: Feb. 12, 2018

(87) PCT Pub. No.: WO2017/077854
PCT Pub. Date: May 11, 2017

(65) Prior Publication Data
US 2018/0232263 A1    Aug. 16, 2018

(30) Foreign Application Priority Data

Nov. 6, 2015   (JP) .................. 2015-218799

(51) Int. Cl.
*G06F 9/54*     (2006.01)
*G06F 9/46*     (2006.01)
(Continued)

(52) U.S. Cl.
CPC ............ *G06F 9/542* (2013.01); *G06F 3/1273* (2013.01); *G06F 9/46* (2013.01); *G06F 11/3013* (2013.01);
(Continued)

(58) Field of Classification Search
None
See application file for complete search history.

(56) References Cited

U.S. PATENT DOCUMENTS

| 7,571,481 B2 | 8/2009 | Shimizu |
| 9,098,577 B1 * | 8/2015 | Amidon ............. G06F 16/70 |

(Continued)

FOREIGN PATENT DOCUMENTS

| JP | 07084838 A | 3/1995 |
| JP | 2012137831 A | 7/2012 |

(Continued)

OTHER PUBLICATIONS

International Search Report and Written Opinion issued in parent International Application No. PCT/JP2016-080822 dated Jan. 10, 2017.

*Primary Examiner* — Craig C Dorais
(74) *Attorney, Agent, or Firm* — Venable LLP

(57) ABSTRACT

In the present invention, an information processing apparatus having an application platform comprises a unit that, when an event occurs within information processing apparatus, obtains log information of the event via the platform and record the log information to a log file; a unit that, via an interface for an application of a first type that operates on the platform, when the application of the first type performs a writing of application information, records the written application information to a log file; and a unit that collects a log file that an application of a second type, that operates on the platform, manages.

9 Claims, 21 Drawing Sheets

(51) Int. Cl.
   *G06F 17/40*    (2006.01)
   *G06F 3/12*     (2006.01)
   *G06F 11/30*    (2006.01)
   *G06F 11/34*    (2006.01)

(52) U.S. Cl.
   CPC ...... *G06F 11/3072* (2013.01); *G06F 11/3476* (2013.01); *G06F 17/40* (2013.01); *G06F 2201/86* (2013.01)

(56) References Cited

U.S. PATENT DOCUMENTS

| | | | |
|---|---|---|---|
| 2003/0005173 A1* | 1/2003 | Shah | G06F 11/3476 719/318 |
| 2006/0069702 A1* | 3/2006 | Moeller | G06F 9/542 |
| 2009/0138871 A1* | 5/2009 | Kimberly | G06F 8/61 717/173 |
| 2009/0307774 A1 | 12/2009 | Shimizu | |
| 2012/0221949 A1* | 8/2012 | Olsa | G06F 11/3476 715/704 |
| 2014/0160514 A1 | 6/2014 | Matsuyama | |
| 2015/0229788 A1 | 8/2015 | Shimizu | |
| 2015/0248262 A1 | 9/2015 | Suzuki | |

FOREIGN PATENT DOCUMENTS

| JP | 2014093025 A | 5/2014 |
|---|---|---|
| JP | 2014179023 A | 9/2014 |

* cited by examiner

[Fig. 1]
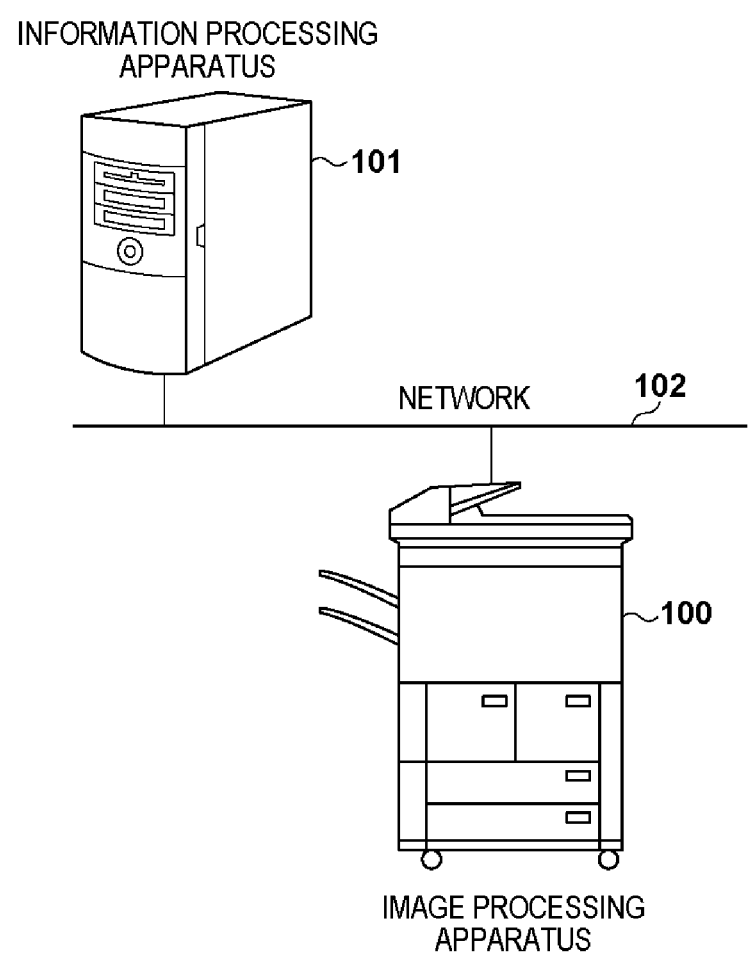

[Fig. 2]
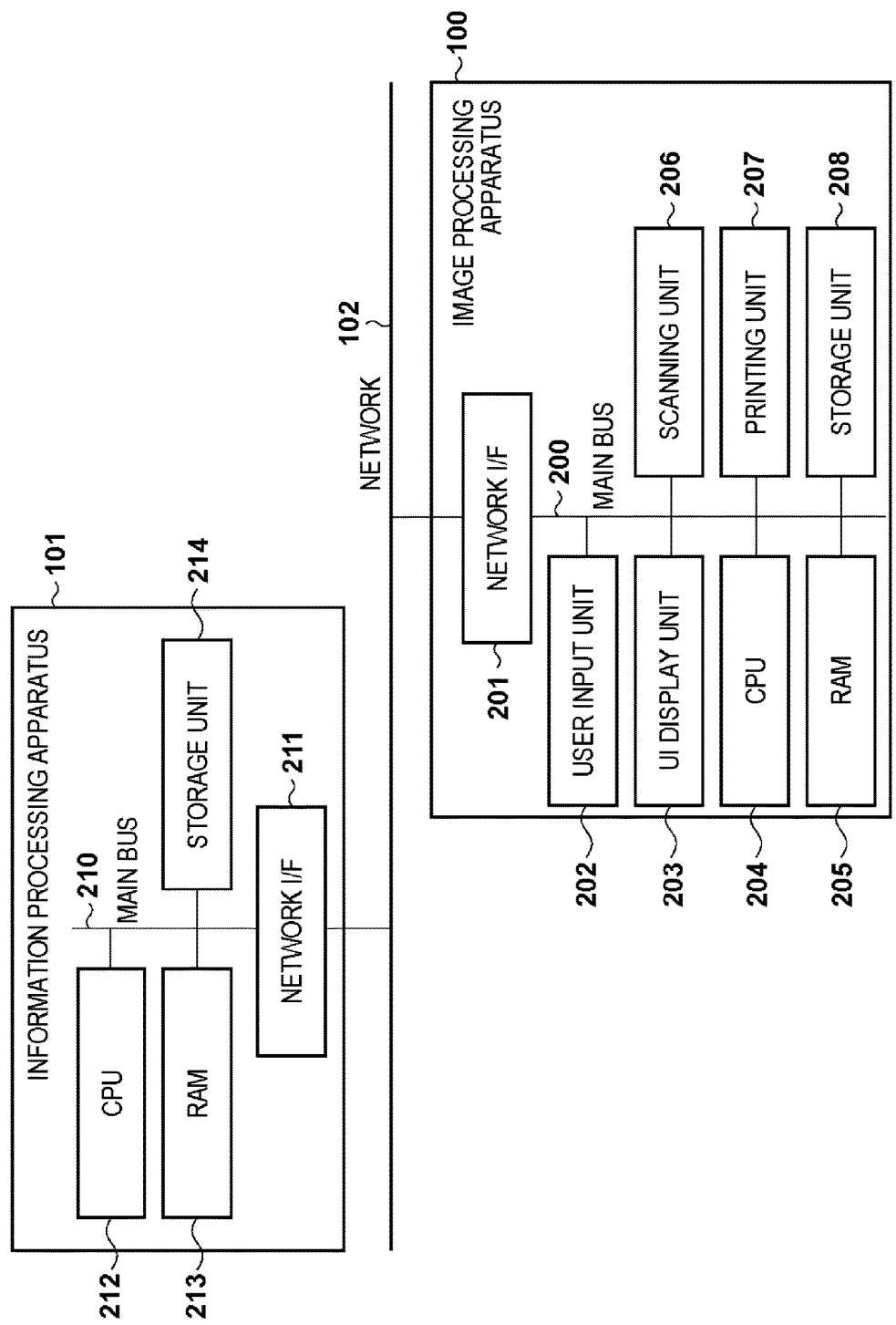

[Fig. 3]
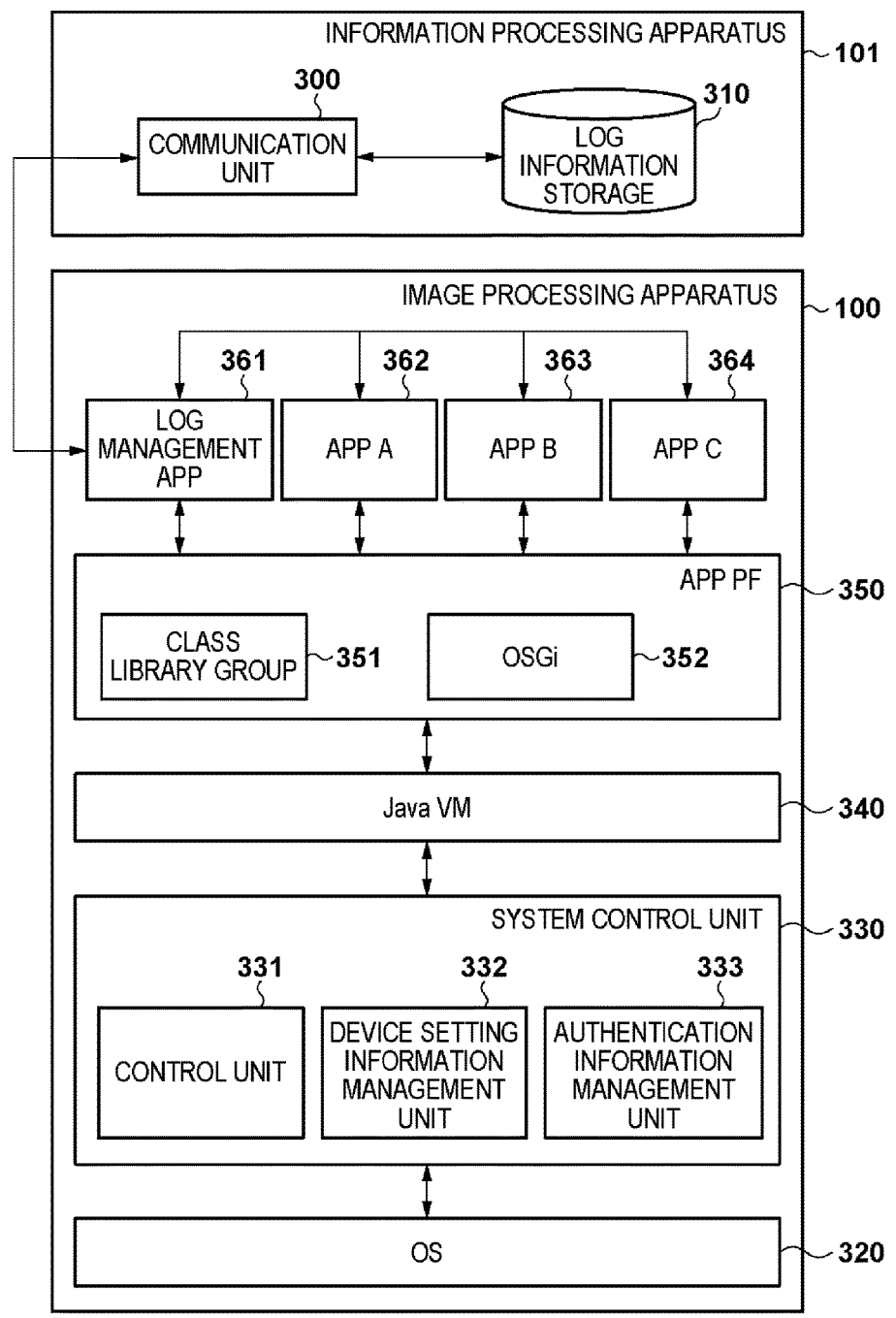

[Fig. 4]
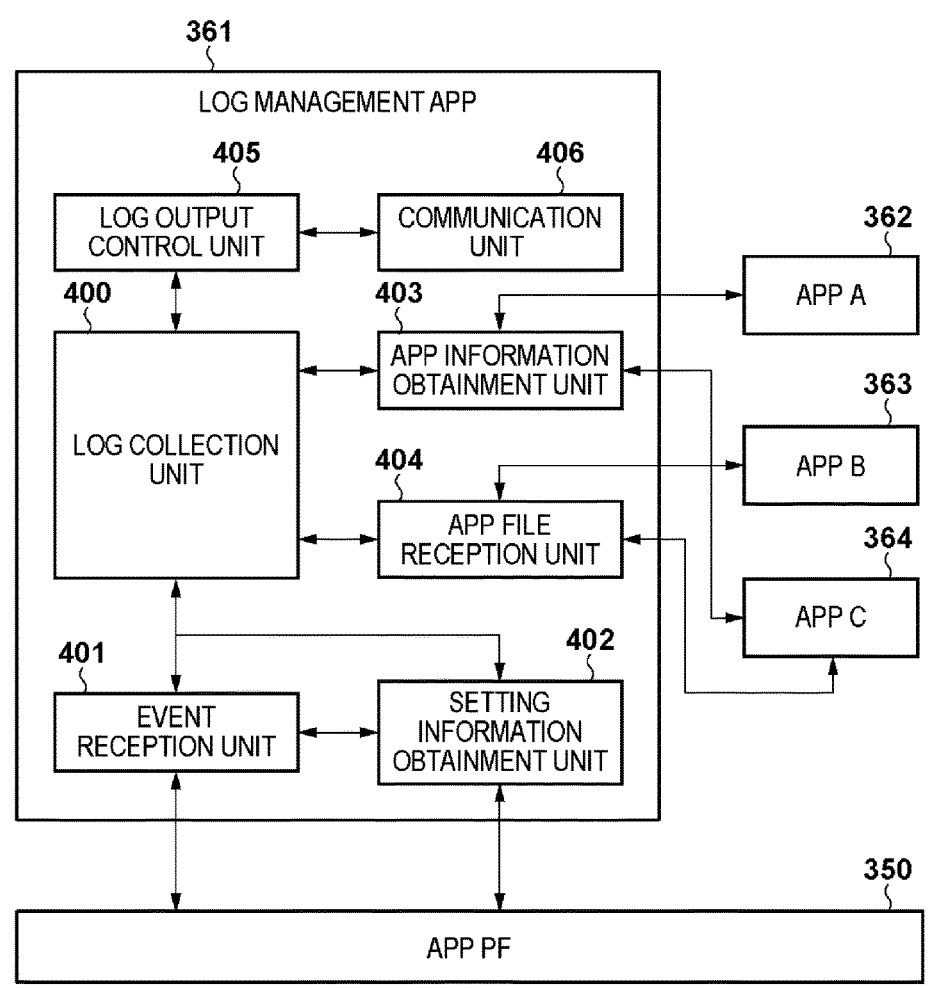

[Fig. 5A]

500
EVENT LOG (PRINT JOB EXECUTION LOG)
FILE NAME : ZZZ99999_1420598072183_PDLPrintJob.csv

| Time (501) | DeviceSerialNo. (502) | JobOwner (503) | JobName | ... |
|---|---|---|---|---|
| 1420598072183 | ZZZ99999 | user1 | jobname1 | ... |
| 1420605433803 | ZZZ99999 | user2 | jobname2 | ... |
| ... | ... | ... | ... | ... |

[Fig. 5B]

510
SETTING INFORMATION LOG (ADDRESS BOOK SETTING INFORMATION LOG)
FILE NAME : ZZZ99999_1420598072183_AddressBookInfo.csv

| Time (511) | DeviceSerialNo. (512) | FaxNumber (513) | ... |
|---|---|---|---|
| 1420598072183 | ZZZ99999 | 0441111222 | ... |
| 1420598072183 | ZZZ99999 | 0443333444 | ... |
| ... | ... | ... | ... |

[Fig. 5C]

520
APP INFORMATION LOG (APP A WRITE LOG)
FILE NAME : ZZZ99999_1420598072183_AppliA.csv

| Time (521) | DeviceSerialNo. (522) | LogLevel (523) | GroupId | Message |
|---|---|---|---|---|
| 1420598072183 | ZZZ99999 | INFO | 0 | XXXXX |
| 1420605734809 | ZZZ99999 | WARNING | 1 | YYYYY |
| ... | ... | ... | ... | ... |

[Fig. 6A]
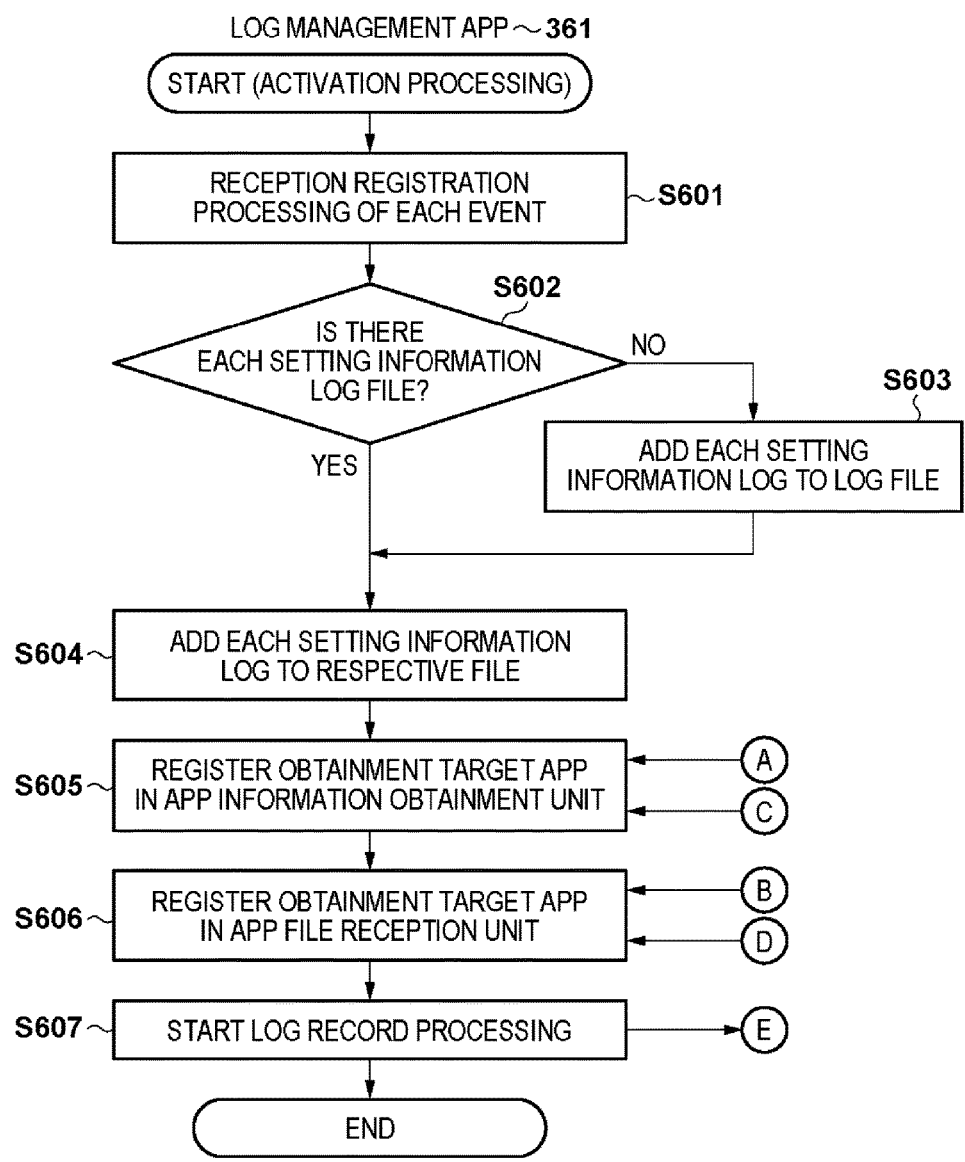

[Fig. 6B]
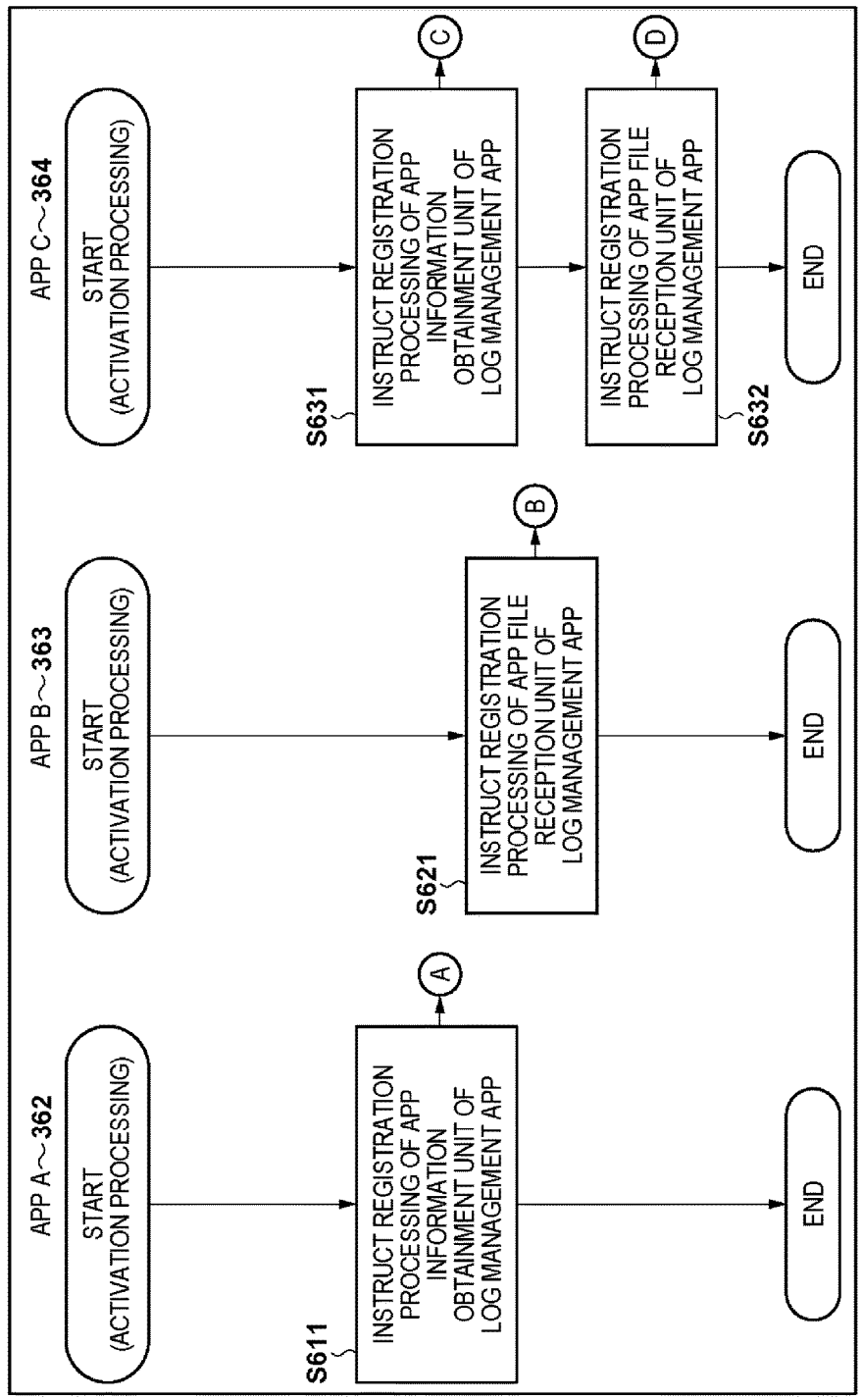

[Fig. 7A]
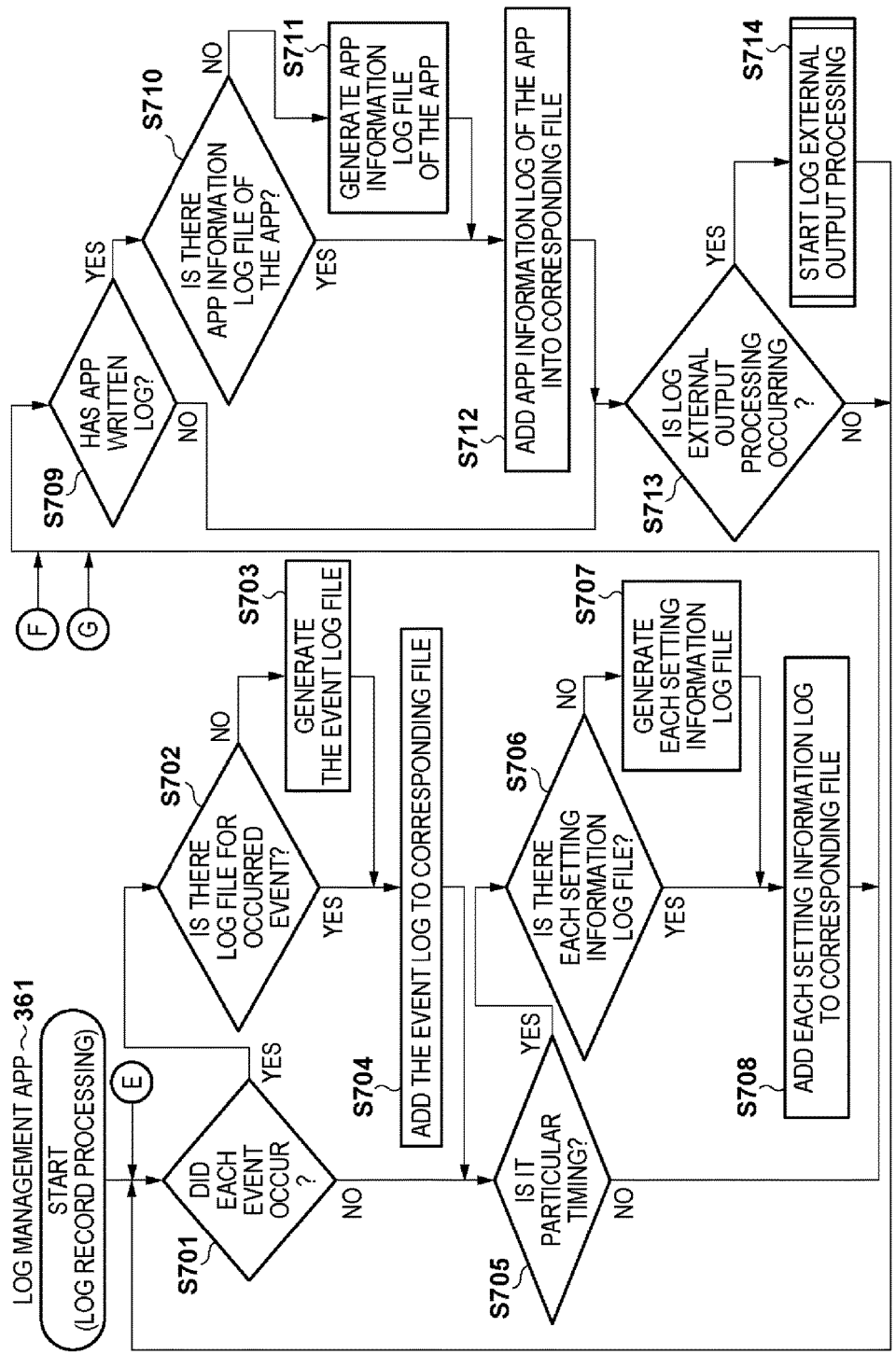

[Fig. 7B]
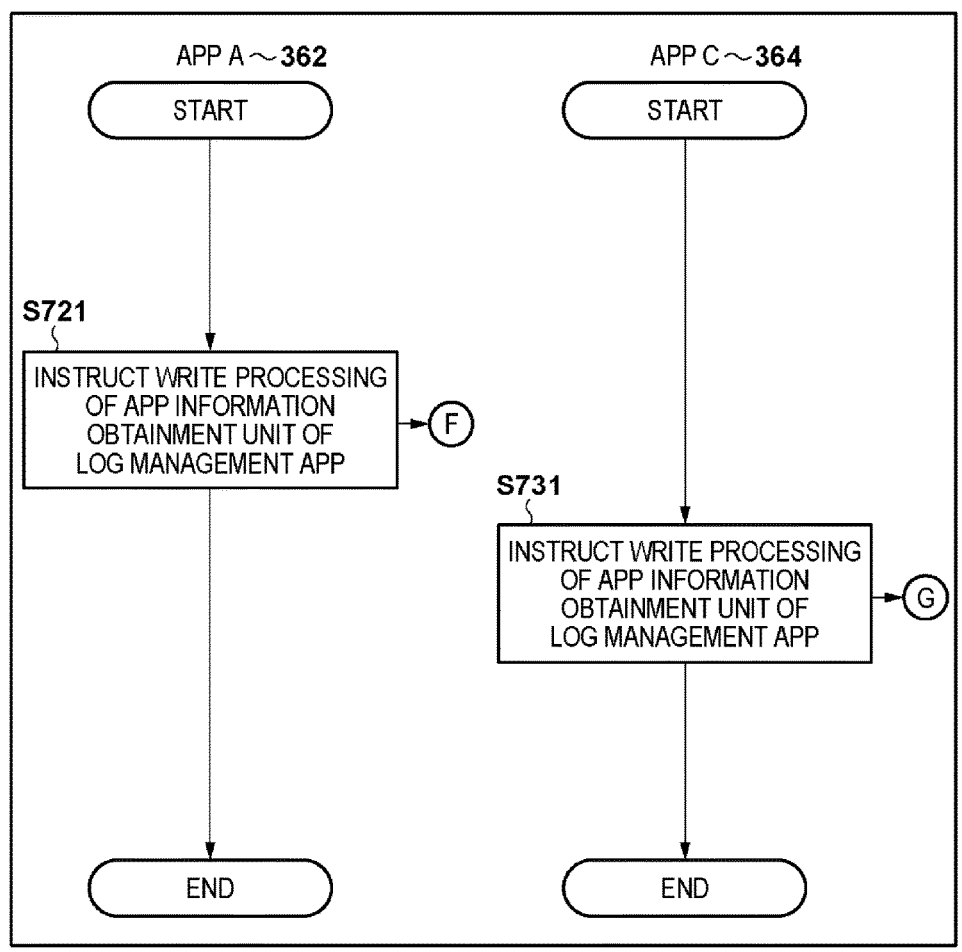

[Fig. 8A]
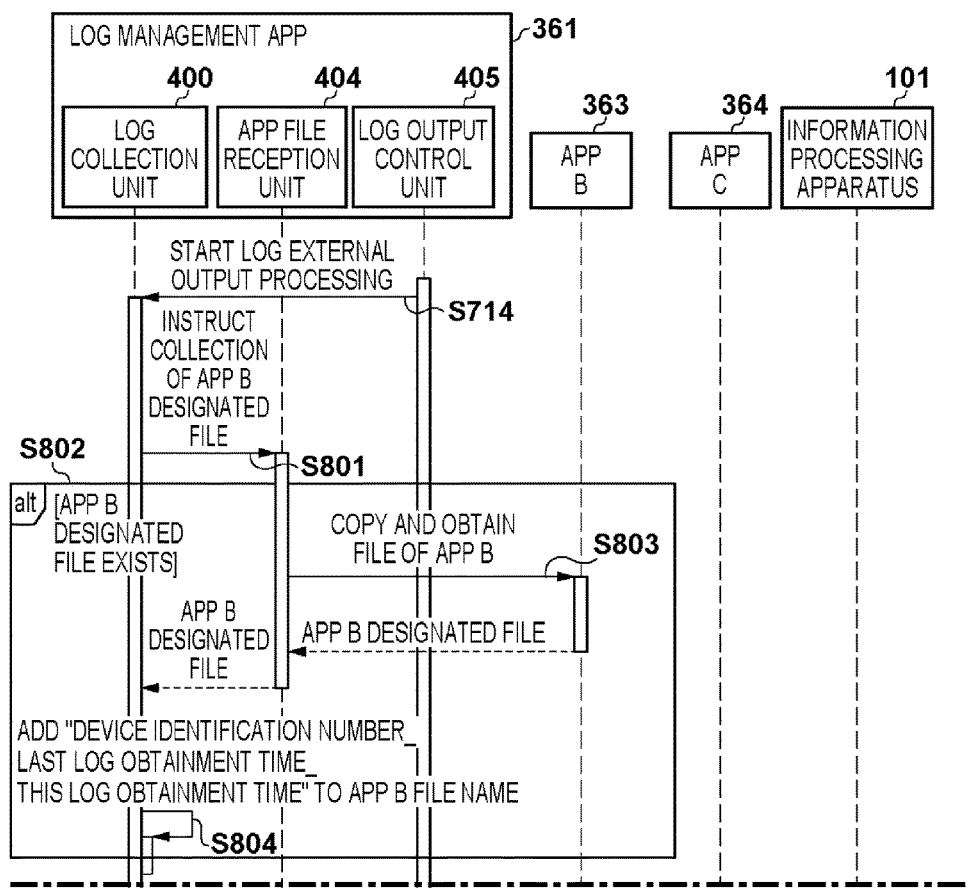

[Fig. 8B]
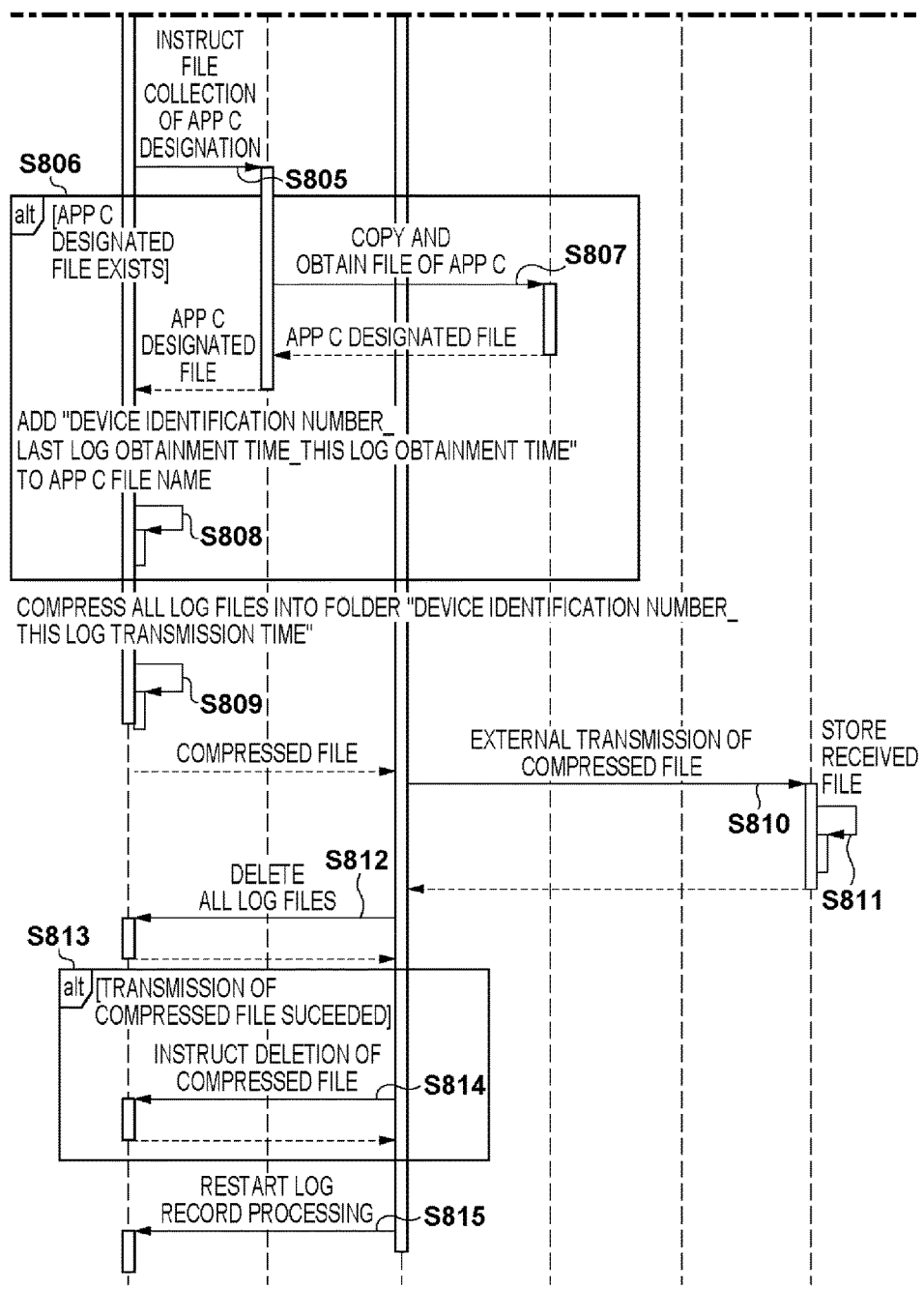

[Fig. 9A]
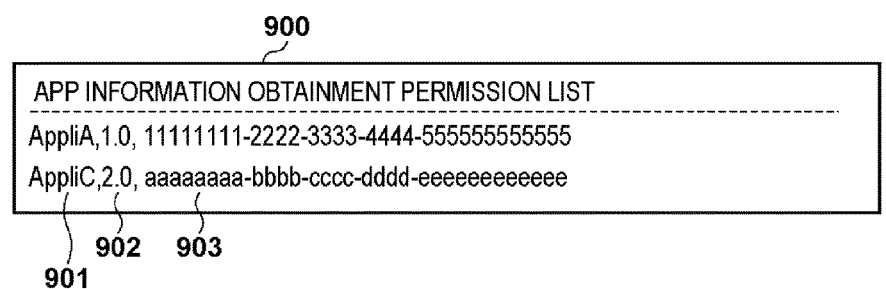
[Fig. 9B]
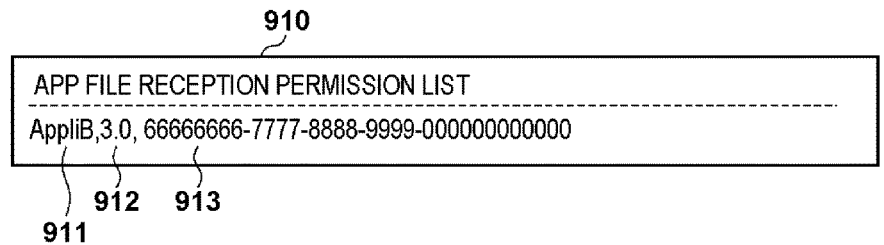

[Fig. 10A]
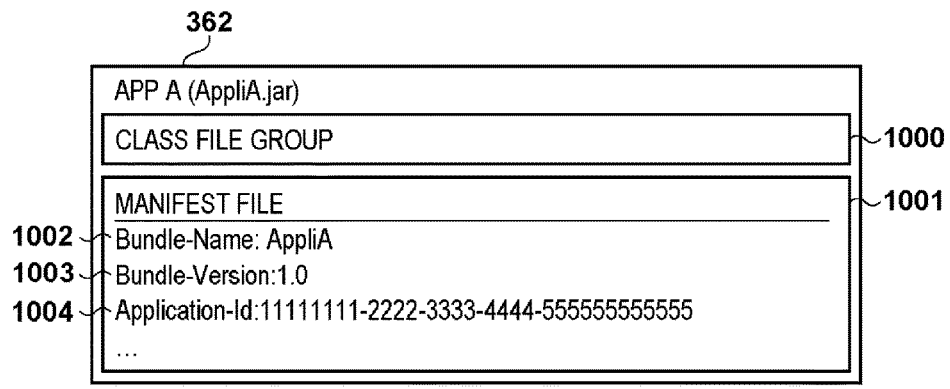
[Fig. 10B]
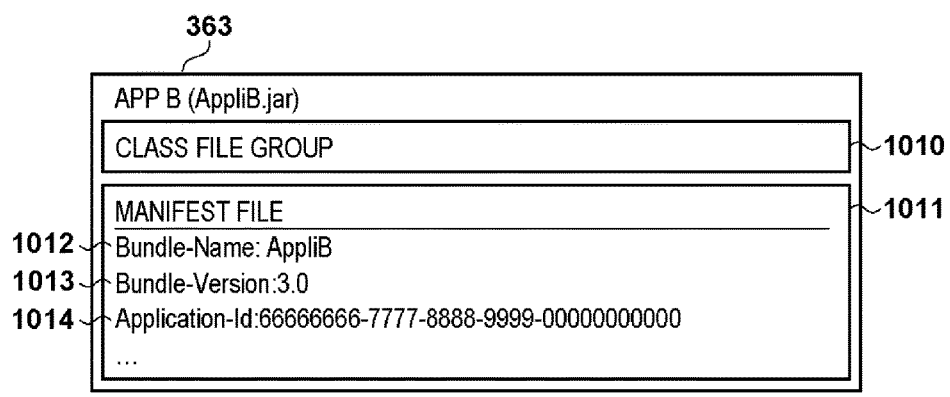
[Fig. 10C]
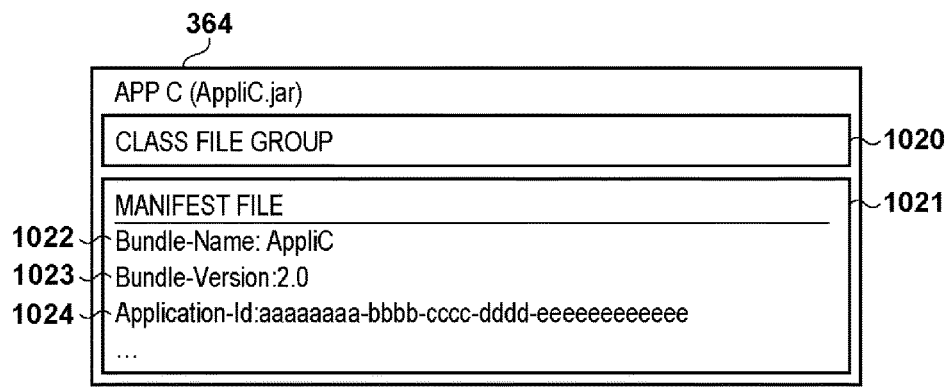

[Fig. 11A]
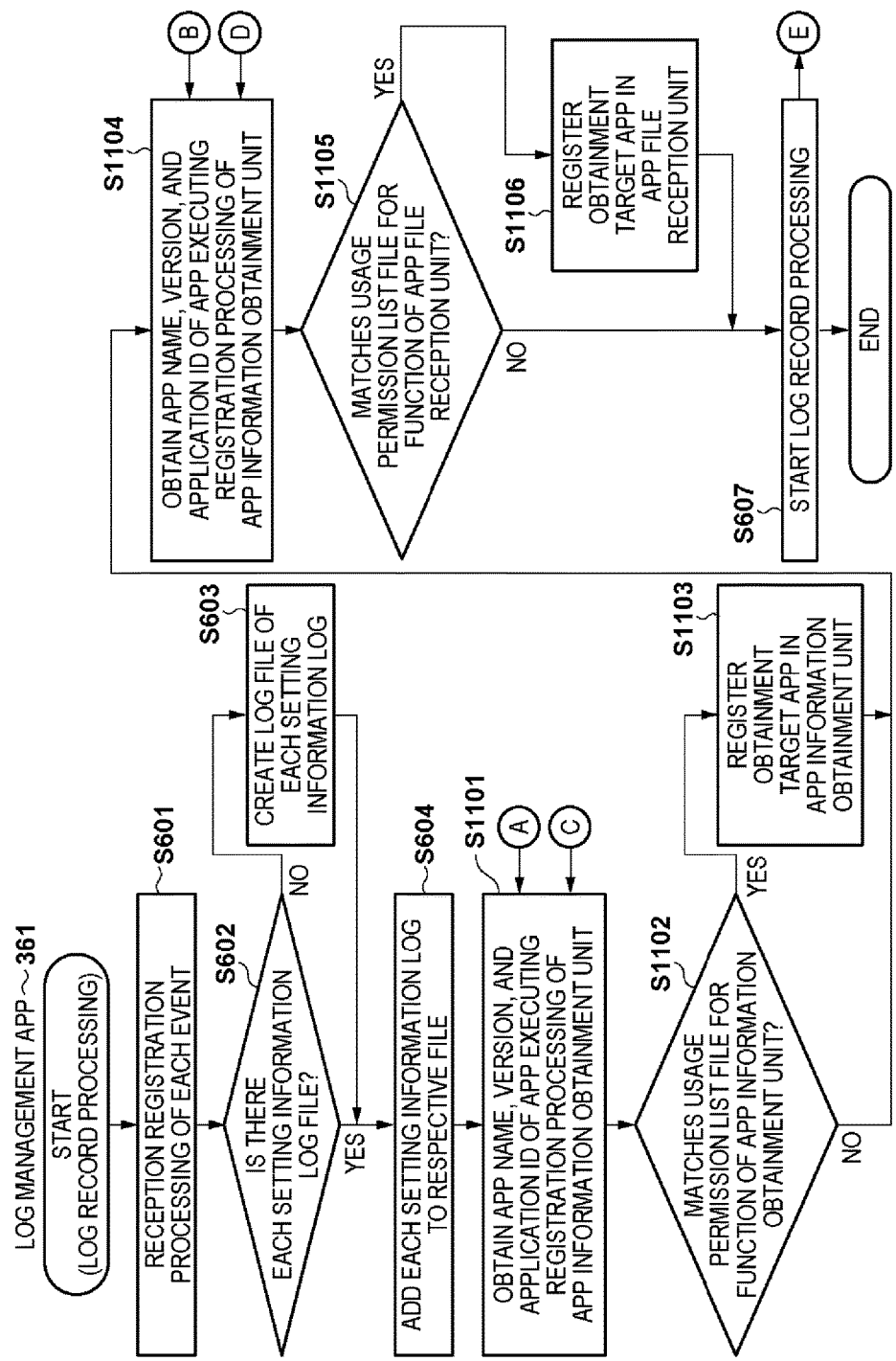

[Fig. 11B]
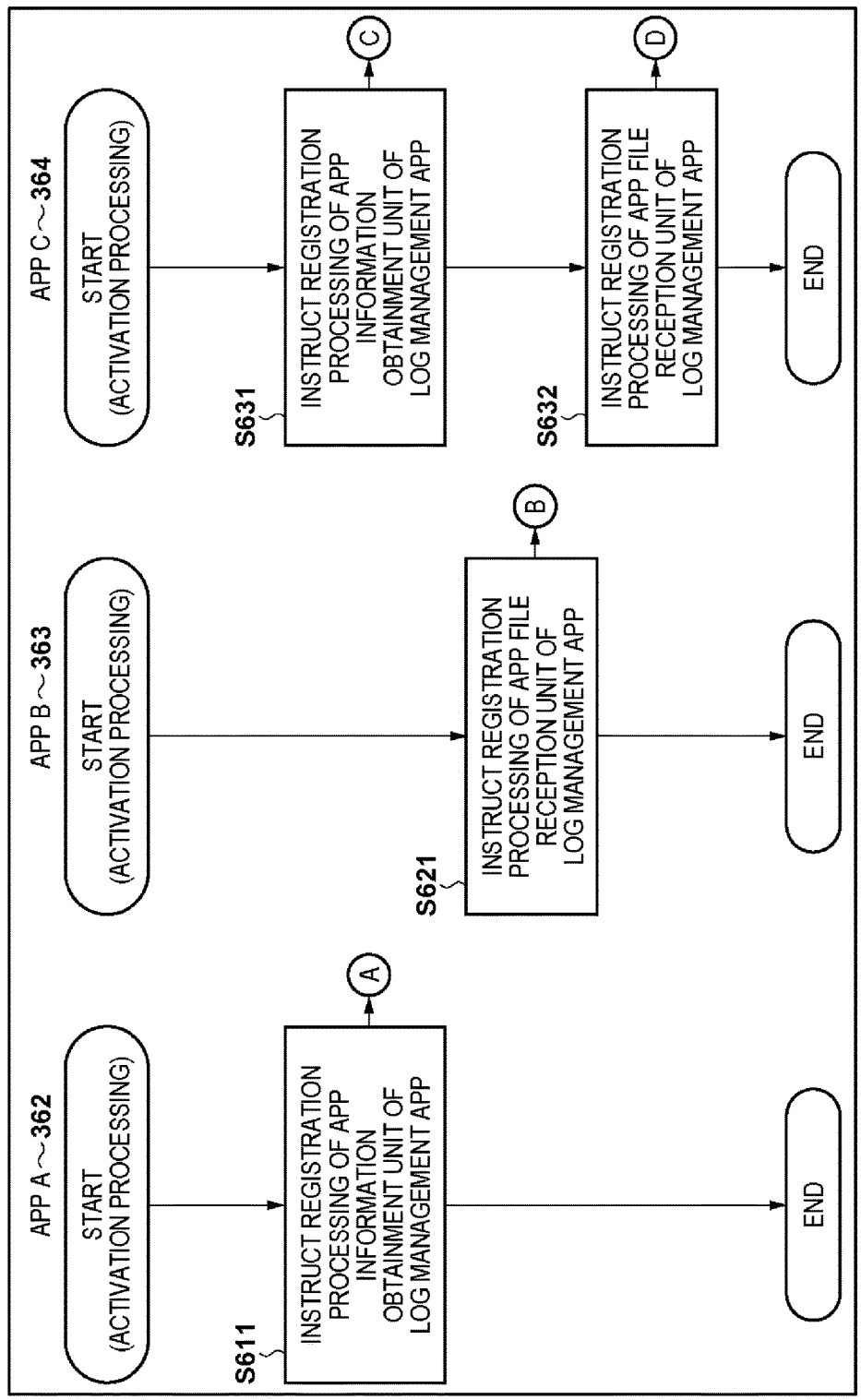

[Fig. 12A]
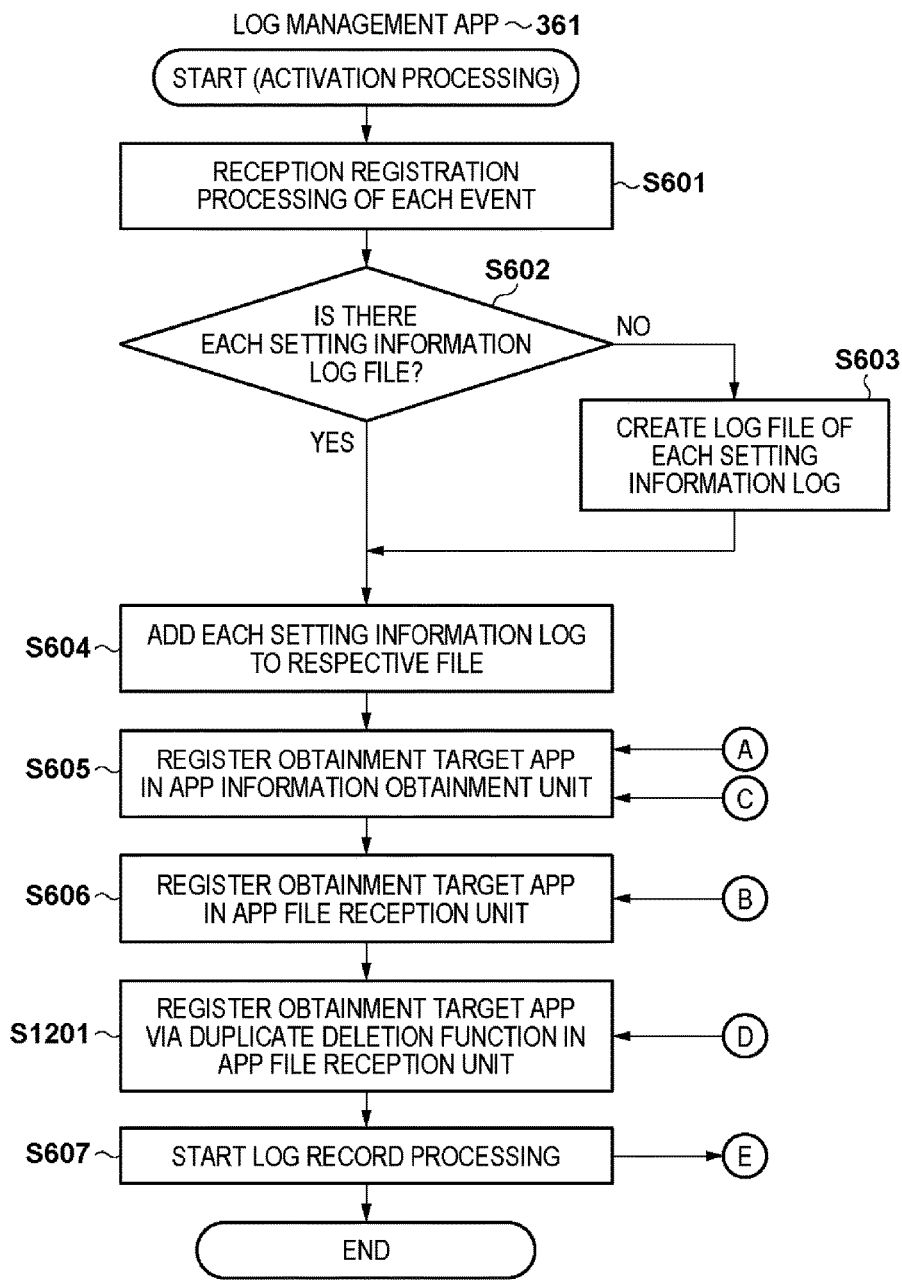

[Fig. 12B]
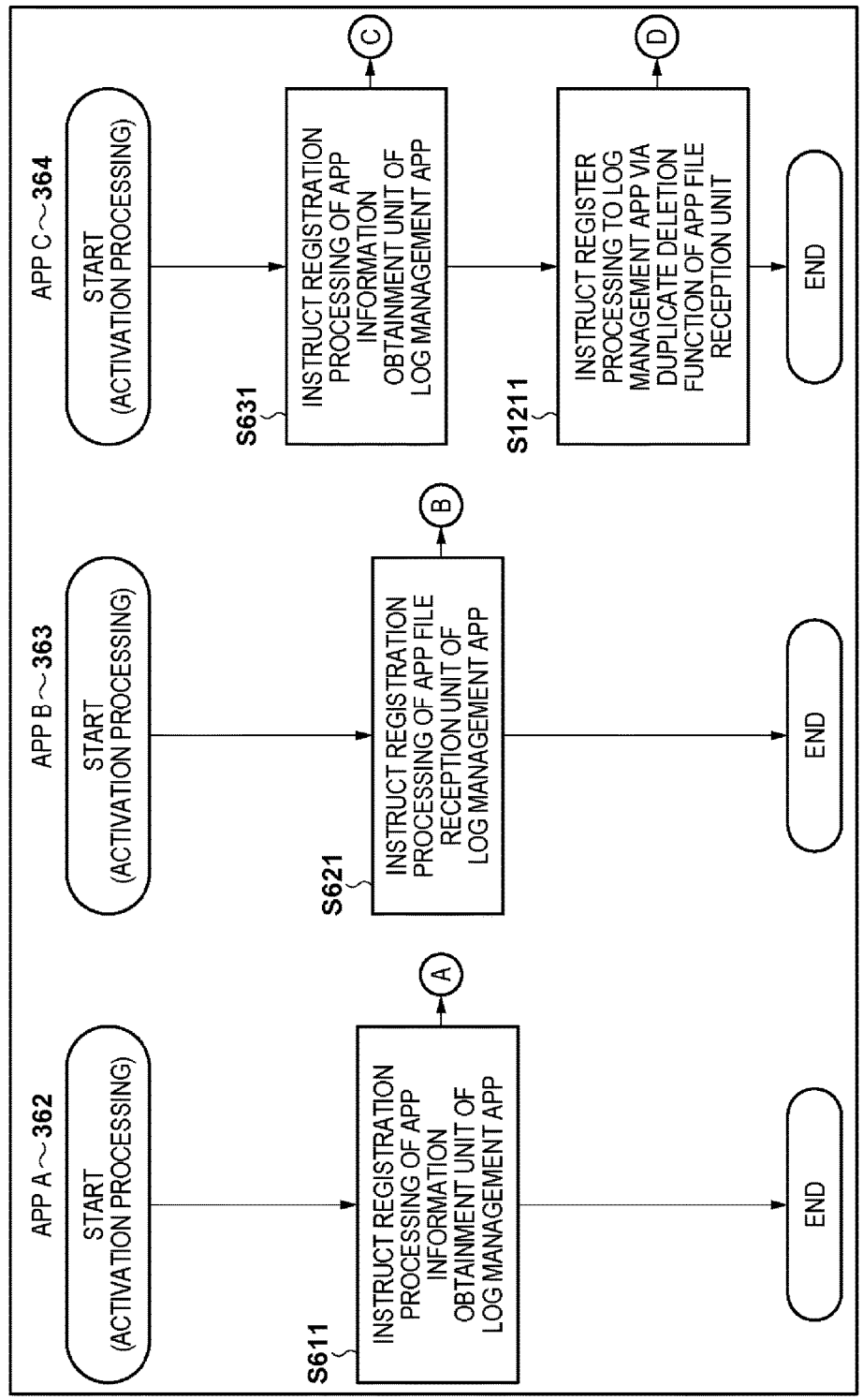

[Fig. 13A]
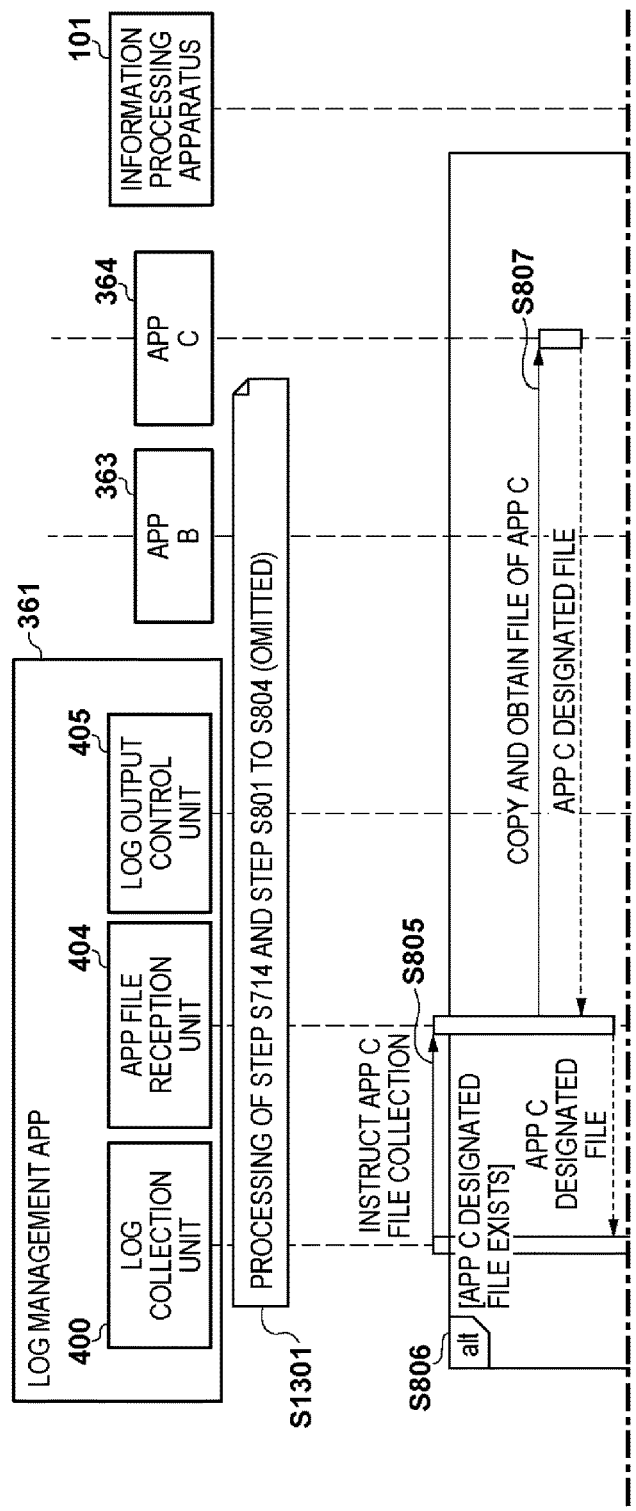

[Fig. 13B]
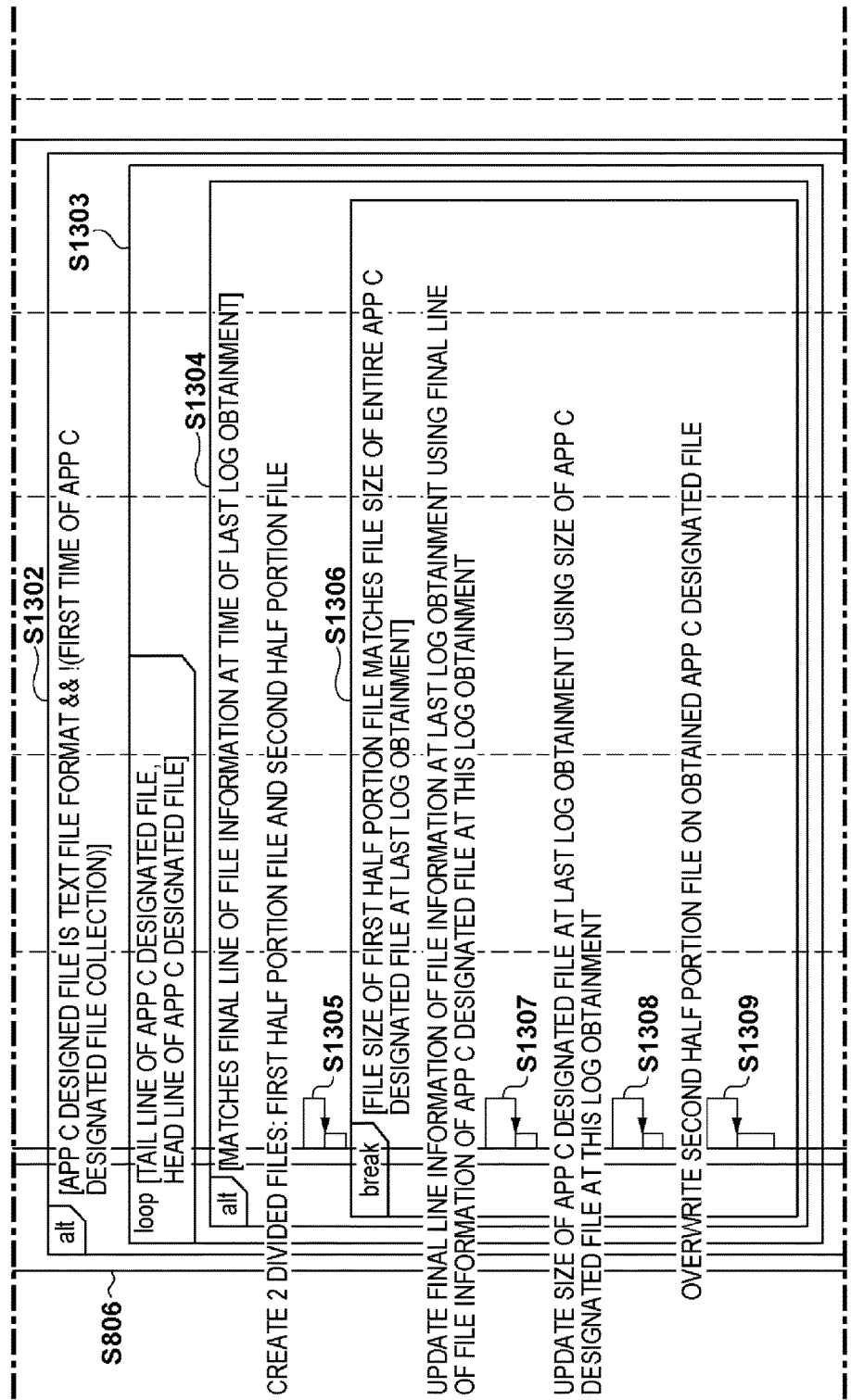

[Fig. 13C]
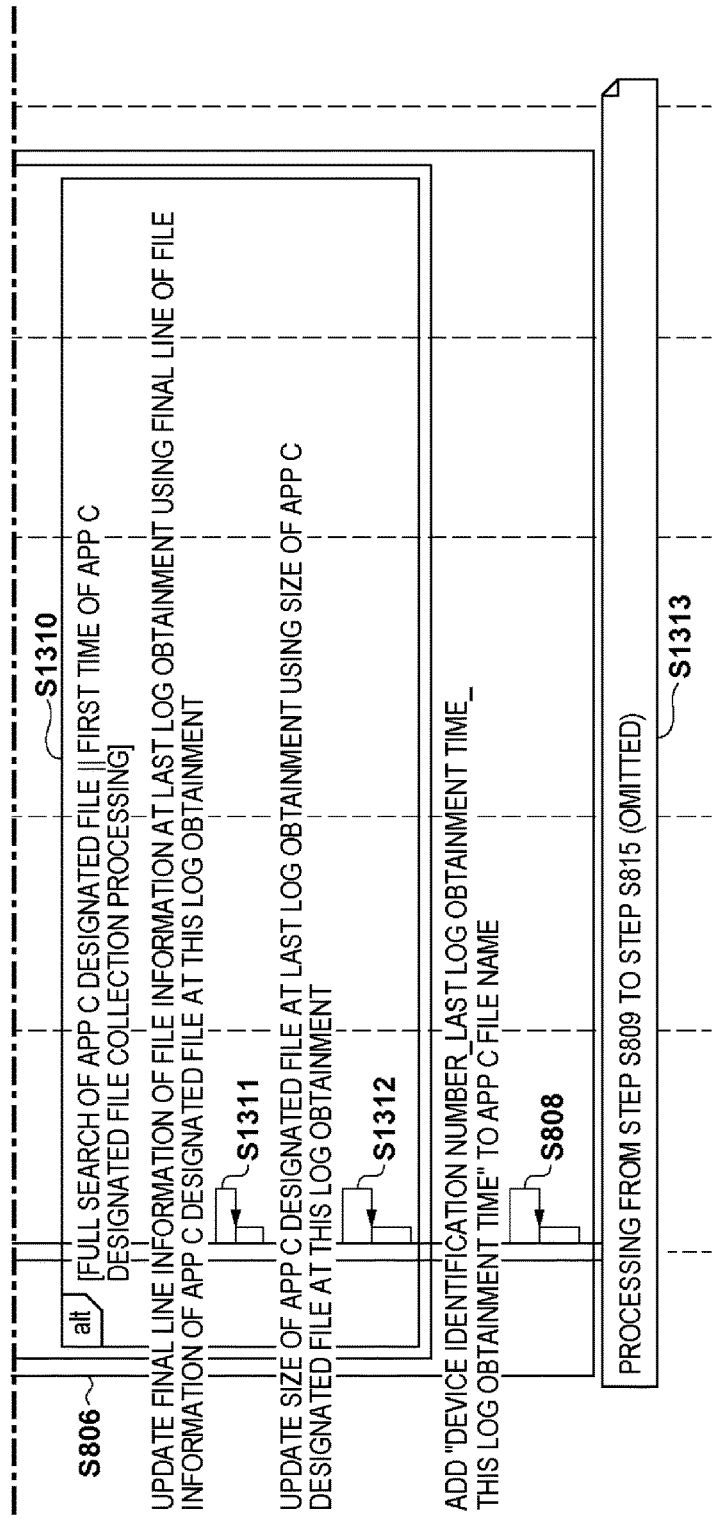

[Fig. 14]

| | APP FILE OF APP C(AppliC.log) |
|---|---|
| 14a | "aaaaaaaa-bbbb-cccc-dddd-eeeeeeeeeeee","INFO","2015 09/07 09:27:26.325","userB","DomainB","0","AAAAA" |
| 1400 | "aaaaaaaa-bbbb-cccc-dddd-eeeeeeeeeeee","INFO","2015 09/07 10:01:55.874","userC","DomainB","0","BBBBB" |
| | ... |
| | "aaaaaaaa-bbbb-cccc-dddd-eeeeeeeeeeee","INFO","2015 09/07 18:39:03.525","userA","DomainB","0","XXXXX" |
| | "aaaaaaaa-bbbb-cccc-dddd-eeeeeeeeeeee","INFO","2015 09/07 19:42:44.250","userA","DomainB","0","YYYYY" ← 1401 |
| 14b | "aaaaaaaa-bbbb-cccc-dddd-eeeeeeeeeeee","INFO","2015 09/07 09:27:26.325","userB","DomainB","0","AAAAA" |
| 1400 | "aaaaaaaa-bbbb-cccc-dddd-eeeeeeeeeeee","INFO","2015 09/07 10:01:55.874","userC","DomainB","0","BBBBB" |
| | ... |
| | "aaaaaaaa-bbbb-cccc-dddd-eeeeeeeeeeee","INFO","2015 09/07 18:39:03.525","userA","DomainB","0","XXXXX" |
| | "aaaaaaaa-bbbb-cccc-dddd-eeeeeeeeeeee","INFO","2015 09/07 19:42:44.250","userA","DomainB","0","YYYYY" ← 1401 |
| 1402 | "aaaaaaaa-bbbb-cccc-dddd-eeeeeeeeeeee","INFO","2015 09/08 08:56:14.913","userC","DomainB","0","AAAAA" |
| | "aaaaaaaa-bbbb-cccc-dddd-eeeeeeeeeeee","INFO","2015 09/08 11:09:11.511","userD","DomainB","0","CCCCC" |
| | "aaaaaaaa-bbbb-cccc-dddd-eeeeeeeeeeee","INFO","2015 09/08 17:12:05.462","userA","DomainB","0","YYYYY" |
| | "aaaaaaaa-bbbb-cccc-dddd-eeeeeeeeeeee","INFO","2015 09/08 18:58:24.657","userA","DomainB","0","ZZZZZ" ← 1403 |
| 14c | "aaaaaaaa-bbbb-cccc-dddd-eeeeeeeeeeee","INFO","2015 09/08 08:56:14.913","userC","DomainB","0","AAAAA" |
| 1402 | "aaaaaaaa-bbbb-cccc-dddd-eeeeeeeeeeee","INFO","2015 09/08 11:09:11.511","userD","DomainB","0","CCCCC" |
| | "aaaaaaaa-bbbb-cccc-dddd-eeeeeeeeeeee","INFO","2015 09/08 17:12:05.462","userA","DomainB","0","YYYYY" |
| | "aaaaaaaa-bbbb-cccc-dddd-eeeeeeeeeeee","INFO","2015 09/08 18:58:24.657","userA","DomainB","0","ZZZZZ" ← 1403 |

INFORMATION PROCESSING APPARATUS, METHOD, AND MEDIUM

TECHNICAL FIELD

The present invention relates to an information processing apparatus, in which a plurality of applications operate on a platform for example, a method, and a medium, and in particular to an information processing apparatus comprising a log management application which records logs, a method, and a medium.

BACKGROUND ART

Typically, in a conventional image processing apparatus (such as a Multi Function Peripheral), there is an environment in which an application platform (a "PF" hereinafter) causes various functions such as a scanner, a printer, and the like to operate in units of applications ("apps" hereinafter). In a case when an application developer, a serviceman, or the like (an "analyst" hereinafter) verifies an operation of an application installed on the application PF, such as in debugging, the verification is performed based on application log information of the application. The application log information is recovered by an analyst by the application log information being generated in a file format by, for example, an application storing events of processing or setting information of itself and transmitting the application log information to an external information processing apparatus (such as a personal computer). Also, there are cases in which an application PF has a means for generating application log information corresponding to an application for example. At this time, the application PF records information of the application in a file format as the application PF log information upon an instruction from the application, and this is recovered by an analyst by connecting to the image processing apparatus from an external information processing apparatus.

Meanwhile, the image processing apparatus, for the analyst to perform an analysis when there is a problem in a product, records events of processing such as a print job execution and setting information of the image processing apparatus as device log information, and has a mechanism for recovering these by a method such as connecting an external device (such as a USB memory).

In Japanese Patent Laid-Open No. 2012-137831, there is a logic analyzer function in an image processing apparatus, and internal signals within hardware, function execution logs of apps on the image processing apparatus, and user operation unit operation logs are recorded in one batch. Also, this image processing apparatus transmits recorded logs to an external malfunction analysis apparatus.

It is difficult for an analyst to ascertain the root cause at a time of a problem occurrence on the image processing apparatus, even if the analyst can determine that there is no problem in the processing of an application by analyzing application log information. In such cases it is necessary to collect and analyze both device log information and application log information.

However, with the technique of Japanese Patent Laid-Open No. 2012-137831, it is difficult to handle the above described log information that the application itself manages and the operation logs in one batch. Additionally, there are various apps, and various methods of recording logs. For example, there are cases in which the application itself manages the logs as described above, and cases in which the application itself does not manage the logs but rather they are recorded by a logger.

CITATION LIST

Patent Literature

[PTL 1] Japanese Patent Laid-Open No. 2012-137831

SUMMARY OF INVENTION

The present invention is something performed in view of the above problem, and collects in a manageable fashion log information issued within the apparatus, log information that an application on a platform instructs the platform to record, and log information that the application manages in one batch.

According to a first aspect of the present invention, there is provided an information processing apparatus having a platform that is an operation environment of an application, the information processing apparatus comprising: first recording means for, as a function of a log management application that operates on the platform, when an event occurs within information processing apparatus, obtaining log information of the event via the platform and record the log information to a log file; second recording means for, as a function of the log management application, via an interface for an application of a first type that operates on the platform and is different to the log management application, when the application of the first type performs a writing of application information, recording the written application information to a log file; and collection means for, as a function of the log management application, collecting a log file that an application of a second type, that operates on the platform and is different to the log management application, manages.

By virtue of the present invention it is possible to collect in a manageable fashion log information issued within the apparatus, log information that an application on a platform instructs the platform to record, and log information that the application manages in one batch.

Further features of the present invention will become apparent from the following description of exemplary embodiments with reference to the attached drawings.

BRIEF DESCRIPTION OF DRAWINGS

FIG. 1 is a system configuration diagram according to a first embodiment

FIG. 2 is a hardware configuration diagram of an image processing apparatus according to the first embodiment FIG. 3 is a software configuration diagram of the image processing apparatus according to the first embodiment FIG. 4 is a log management application configuration diagram according to a first embodiment FIG. 5A is a figure for explaining formats of logs that the log management application records in a log collection unit according to the first embodiment FIG. 5B is a figure for explaining formats of logs that the log management application records in a log collection unit according to the first embodiment FIG. 5C is a figure for explaining formats of logs that the log management application records in a log collection unit according to the first embodiment FIG. 6A is a flowchart of processing of the log management application when an application PF according to the first embodiment activates each application FIG. 6B is a flowchart of processing of the log management application when an application PF according to the first embodiment activates each application FIG. 7A is a flowchart of log record processing of the log management application according to the first embodiment FIG. 7B is a flowchart of log record processing of the log management application according to the first embodiment FIG. 8A is a sequence diagram of log output processing of the log management application according to the first embodiment FIG. 8B is a sequence diagram of log output processing of the log management application according to the first embodiment FIG. 9A is a configuration diagram of a list file of an application which permits usage of a function of the log management application according to a second embodiment FIG. 9B is a configuration diagram of a list file of an application which permits usage of a function of the log management application according to a second embodiment FIG. 10A is a configuration diagram of applications which use the function of the log management application according to the second embodiment FIG. 10B is a configuration diagram of applications which use the function of the log management application according to the second embodiment FIG. 10C is a configuration diagram of applications which use the function of the log management application according to the second embodiment FIG. 11A is a flowchart for a time of an activation process of an application of the application PF according to the second embodiment FIG. 11B is a flowchart for a time of an activation process of an application of the application PF according to the second embodiment FIG. 12A is a flowchart for a time of an activation process of an application of an application PF according to a third embodiment FIG. 12B is a flowchart for a time of an activation process of an application of an application PF according to a third embodiment FIG. 13A shows a sequence diagram of log output processing of the log management application according to the third embodiment FIG. 13B shows a sequence diagram of log output processing of the log management application according to the third embodiment FIG. 13C shows a sequence diagram of log output processing of the log management application according to the third embodiment FIG. 14 shows explanatory views of an application file which the log management application according to the third embodiment outputs

DESCRIPTION OF EMBODIMENTS

Hereinafter, embodiments for working the present invention are explained using drawings.

First Embodiment

<Configuration of Image Processing System and Each Apparatus>

Firstly, a description will be given for a configuration of a system of the present embodiment using from FIG. 1 to FIG. 3. FIG. 1 is an example configuration of an entire information processing system of the present embodiment. The present system is configured from an image processing apparatus 100 and an information processing apparatus 101 via a network 102. The image processing apparatus 100 is an apparatus which has an image forming apparatus, an image reading apparatus, and various image processing functions such as an image transmission function. Note that the image processing apparatus 100 may be a printer, a copier, a fax machine, a scanner, or an MFP (Multi Function Peripheral) that realizes a plurality of functions of these within one housing. The information processing apparatus 101 is an information processing apparatus such as a computer for performing operation of the image processing apparatus 100 via a Web browser or the like remotely. Note, the image processing apparatus 100 is an image processing apparatus whose main target of processing is images, but it may be an information processing apparatus comprising a peripheral device and software for executing a print or a reading of an image.

FIG. 2 is an example of hardware configurations of each of the image processing apparatus 100 and the information processing apparatus 101 of the present embodiment. The image processing apparatus 100 has a network I/F 201 which performs communication with the information processing apparatus 101 which may be a PC, a user input unit 202 which accepts a user operation such as a keyboard, and a UI display unit 203 which displays an operation screen on a liquid crystal display or the like. Furthermore, the image processing apparatus 100 has a CPU 204 which controls the whole apparatus, a RAM 205 which provides a work space for the CPU 204, a scanning unit 206 which reads an image original, a printing unit 207 which prints image data, and a storage unit 208 which stores various control programs and the like. Here, respective units which configure the image processing apparatus 100 are connected by a main bus 200, and are capable of transmission and reception of data mutually. Note, although the user input unit 202 and the UI display unit 203 are described as separate units, configuration may be taken such that these units are integrated as an operation unit. The CPU 204 realizes particular functions and controls the apparatus by executing system programs or application programs stored in the RAM 205, the storage unit 208, or the like. An operating system or a driver, or additionally software which is a platform for executing an application program or the like are included in the system programs. Note, application program is abbreviated as application.

The information processing apparatus 101 has a network I/F 211 which performs communication with the image processing apparatus 100 or the like, a CPU 212 which controls the whole apparatus, a RAM 213 which provides a work space for the CPU 212, and a storage unit 214 which stores each control program or the like. Also, respective units which configure the information processing apparatus 101 are connected by a main bus 210, and are capable of transmission and reception of data mutually. The CPU 212 realizes particular functions and controls the apparatus by executing system programs or application programs stored in the RAM 213, the storage unit 214, or the like.

<Software Configuration>

FIG. 3 is an example of a software configuration of the image processing apparatus 100 and the information processing apparatus 101 of the present embodiment. The CPU 204/the CPU 212, that the image processing apparatus 100/information processing apparatus 101 respectively have, read control programs stored in the storage unit 208/the storage unit 214 into the RAM 205/RAM 213 and execute them to realize each functional unit illustrated in FIG. 3. Note, FIG. 3 is not something that illustrates all software that each apparatus includes.

Firstly, explanation will be given regarding software the information processing apparatus 101 includes. The information processing apparatus 101 includes a communication unit 300 and a log information storage 310. The communication unit 300 is software that controls the network I/F 211 to perform HTTP communication. The log information storage 310 is something that is stored in the storage unit 214, and that stores log information files that are transmitted from the log management application (log management application) 361 and received by the communication unit 300.

Next, explanation will be given regarding software the image processing apparatus 100 includes. The image processing apparatus 100 has an operating system (OS) 320, a system control unit 330, a Java (registered trademark) virtual machine (JavaVM) 340, and an application platform (application PF) 350. The OS 320 executes process management, memory management, and input/output management. The system control unit 330 is a program which realizes basic functions of the image processing apparatus 100 such as copying, and has a control unit 331, a device setting information management unit 332, an authentication information management unit 333, and the like. The control unit 331 controls systems such as operation screens which display on the UI display unit 203 and each function of the image processing apparatus 100 such as those of the copier and the printer. The device setting information management unit 332 manages device system setting information such as settings for each function such as scan and display screen settings for devices in the image processing apparatus 100. The authentication information management unit 333 performs processing related to user authentication in the image processing apparatus 100. The authentication information management unit 333 searches an authentication DB (not shown) for authentication information and user information that a user entered via the user input unit 202 or the like, and puts the user into a logged in state in relation to the image processing apparatus 100 if it is registered authentication information and user information. Also, if a user in a logged in state performs a logout operation via the user input unit 202 or the like, the authentication information management unit 333 puts the user into a logged out state in relation to the image processing apparatus 100. By the authentication function, the image processing apparatus 100 performs user authentication management, and performs restriction of provided functions in accordance with an authority of a user in a logged in state.

The Java (registered trademark) VM 340 is a virtual machine which executes Java (registered trademark) programs and is an execution platform of the application PF 350. The application PF 350 is an execution platform for apps which provides functions for controlling the image processing apparatus 100 to the application. The application PF 350 has a class library group 351 which configures the platform and an OSGi (registered trademark) 352 which performs life cycle or reference relation management of apps. The class library group 351, has a function for making it possible for an application to control the device setting information management unit 332 and the control unit 331 which controls the image processing apparatus 100. In addition, the class library group 351, in relation to the application, has a function for providing the Java (registered trademark) VM 340 to apps and a function for making it possible for an application to control a function for provided by another application that is managed by the OSGi (registered trademark) 352.

A log management application 361, an application A 362, an application B 363, and an application C 364 are apps which operate on the application PF 350. The log management application 361 is an application that obtains an execution event of control processing for copying or the like in the system control unit 330 or setting information of the image processing apparatus 100 via the application PF 350, and records these as log information. Also, the log management application 361, in relation to another application, has a function for another application to write log information to the log management application 361 and a function for causing files which another application itself has to be collected in the log management application 361. Specifically, the log management application 361 can in a centralized fashion record log information issued within the image processing apparatus 100, log information whose recording another application being executed on the application platform instructed via the platform, and log information that another application manages. Note, in the explanation hereinafter, there exists cases in which an application instructs the log management application 361 to record a log via the platform and there are cases in which the explanation omits the intermediation of the platform. Additionally, the log management application 361 has a function for externally outputting in one batch files of log information collected and recorded by the previously described functions. Regarding a detailed configuration of the log management application 361, description will be given by a configuration diagram of FIG. 4 described later. The application A 362, the application B 363, and the application C 364 are apps which have functions for controlling the image processing apparatus 100 by the system control unit 330 via the application PF 350. Also, the application A 362, the application B 363, and the application C 364 have processing that uses functions provided by the log management application 361 to record log information of themselves to the log management application 361. The application A 362, the application B 363, and the application C 364 are programs for fulfilling functions particular to each application. Whatever these are, they cause log information to be passed to the log management application 361 via the application PF 350 and recorded, or the apps themselves record the log information and manage it.

An explanation regarding a configuration of the log management application 361 in the present embodiment is given in FIG. 4, and regarding formats of log information that the log management application 361 records using FIG. 5A, FIG. 5B, and FIG. 5C. FIG. 4 is a configuration diagram of the log management application 361 in the present embodiment. The log management application 361 has a log collection unit 400, an event reception unit 401, a setting information obtainment unit 402, an application information obtainment unit 403, an application file reception unit 404, a log output control unit 405, and a communication unit 406.

The log collection unit 400 has a function for receiving log write instructions from the event reception unit 401 and the application information obtainment unit 403, and storing information of the instructions to a storage area of the log management application 361 as a file of log information. Also, the log collection unit 400 has a function for instructing the setting information obtainment unit 402 and the application file reception unit 404 to respectively obtain setting information and an application file, and storing the obtained information to a storage area of the log management application 361 as a log information file. In addition, the log collection unit 400 has a function for receiving an instruction for an external output of log information from the log output control unit 405, compressing a file of log information stored in the storage area of the log management application 361, and outputting it in one batch.

The event reception unit 401 receives processing execution events from the OSGi (registered trademark) 352, the Java (registered trademark) VM 340, the control unit 331, and the authentication information management unit 333 via the class library group 351 of the application PF 350. Also, the event reception unit 401 has a function for performing an instruction to record information of a received execution event to the log collection unit 400 as log information. Here, a processing execution event includes the four items below in the respective systems. Specifically, In the OSGi (registered trademark) 352, change of a life cycle state (install/start/stop/uninstall) of an application managed by the OSGi (registered trademark) 352.

In the apps on the application PF 350 and the control unit 331, change of an operation screen which displays on the UI display unit 203.

In the control unit 331, job execution of respective functions of the image processing apparatus such as copy, printer, scanner, FAX, and recording of history of executed jobs.

In the authentication information management unit 333, change of a logged in/logged out state of a user.

Other than an occurrence of the above described events, at a timing of at least one of a file output process and an activation of the image processing apparatus 100, the event reception unit 401 obtains log information of an event log issued within the image processing apparatus (specifically within the information processing apparatus) via the application PF 350 and records it by the log collection unit 400 to the log file.

The setting information obtainment unit 402 receives an instruction from the log collection unit 400 and obtains setting information of the device that the OSGi (registered trademark) 352 and the device setting information management unit 332 store via the class library group 351 of the application PF 350. Also, the setting information obtainment unit 402 has a function for performing an instruction to record the obtained information to the log collection unit 400 as log information. Here, setting information of the devices refers to the 2 items below in the respective systems. Specifically, in the OSGi (registered trademark) 352, setting information (application name, version information, or the like) of an application managed by the OSGi (registered trademark) 352.

in the device setting information management unit 332, system setting information of the image processing apparatus 100 such as settings of respective functions such as scan, and display screen settings.

The application information obtainment unit 403 provides a function that makes it possible to write application log information to an application on the application PF 350 via the OSGi (registered trademark) 352 of the application PF 350. The application information obtainment unit 403 has a function for performing an instruction to record to the log collection unit 400 information for which a write instruction according to this function is received from the application. Note, in the present embodiment, the application A 362 and the application C 364 write information through this function.

The application file reception unit 404 provides a function for instructing an application on the application PF 350 to record a file of log information or the like that the application itself possesses to the log collection unit 400 via the OSGi (registered trademark) 352 of the application PF 350. The application file reception unit 404 has a function for collecting files that an application designates in combination with the instruction for an external output of log information from the log output control unit 405 when an instruction for collecting files according to this function is received from the application. Note, in the present embodiment, the application B 363 and the application C 364 make instructions to record to the log collection unit 400 files which are recorded in their own storage areas through this function.

The log output control unit 405 has an output function for giving to the log collection unit 400 an output instruction for outputting log information externally, and externally outputting via the communication unit 406 a file compressed after the log collection unit 400 collects log information files on the storage area of the log management application 361. Note, in the present embodiment, the log output control unit 405 outputs the compressed file to the log information storage 310 of the information processing apparatus 101 and performs HTTP communication with the communication unit 300 via the communication unit 406. However, the configuration for realizing the output function is not specifically restricted if the configuration is such that the log output control unit 405 is capable of externally outputting the compressed files by the communication unit 406. For example, the log output control unit 405 may copy the compressed files to a USB memory (not shown) connected to the image processing apparatus 100.

<Example Configuration of Log Information>

FIG. 5A, FIG. 5B, and FIG. 5C are explanatory views regarding formats of log information that the log management application 361 instructs the log collection unit 400 to record. Note that here, a description of the format of the log information is omitted because the format and file extension are irrelevant for a file that an application itself possesses, which the log management application 361 records in the log collection unit 400 by the application file reception unit 404.

FIG. 5A is a view for illustrating an example of description information of an event log 500 that the event reception unit 401 records in the log collection unit 400. The event log 500 is configured by an event occurrence time 501, a device identification number 502, and event-specific information 503, and indicates a print job execution log as an example. In the event log 500, one line's worth of the event occurrence time 501, the device identification number 502, and the event-specific information 503 is added every time an event occurs. In the case of FIG. 5A, the event occurrence time 501, the device identification number 502, and the event-specific information 503 are added in one line every time a print job execution occurs. The event occurrence time 501 is a time at which log information is recorded from the event reception unit 401 to the event log 500, and the recording is made in Unix time in the present embodiment. The device identification number 502 is a device identification number of a specific image processing apparatus 100 on which the log management application 361 operates, and is configured by an 8 digit alpha numeral in the present embodiment. The event-specific information 503 expresses specific information of each event that the event reception unit 401 notifies, and records a print job executor name, a print job name, and the like as a print job execution log in the example of FIG. 5A. Also, the event log 500 is recorded in a Comma Separated Values (CSV) file format for each event by the event reception unit 401 as "device identification number_file generation time event name.csv".

FIG. 5B is a view illustrating an example of description information of a setting information log 510 that the setting information obtainment unit 402, after receiving an instruction from the log collection unit 400, records to the log collection unit 400. The setting information log 510 is configured by a log recording time 511, a device identification number 512, and device-specific information 513, and indicates an information log of an address book which registers a transmission destination of a FAX, a file server, or the like as an example. In the setting information log 510, every time of log information recording processing from the setting information obtainment unit 402, one line's worth of the log recording time 511, the device identification number 512, and the device-specific information 513 is added. Note, if a plurality of pieces of information are set in relation to a single piece of setting information as with the address book information, the log recording time 511, the device identification number 512, and the device-specific information 513 of a plurality of lines are added in relation to a single log information recording process from the setting information obtainment unit 402. In the case of FIG. 5B, in relation to one log information recording process from the setting information obtainment unit 402, two lines' worth of information that is already registered to the address book at that time, are added as the log recording time 511, the device identification number 512, and the device-specific information 513. The log recording time 511 is the time at which the instruction from the log collection unit 400 is received and the setting information obtainment unit 402 records log information to the setting information log 510, and the recording is performed in Unix time in the present embodiment. The device identification number 512 is something that is equivalent as the device identification number 502. The device-specific information 513 expresses specific information of each piece of setting information that the setting information obtainment unit 402 collected, and records FAX numbers and the like as address book information in the example of FIG. 5B. Also, the setting information log 510 is recorded in a CSV file format for every piece of setting information by the setting information obtainment unit 402 as "device identification number_file generation time_setting information name.csv".

FIG. 5C is a view for illustrating an example of description information of an application information log 520 that the application information obtainment unit 403 records in the log collection unit 400. The application information log 520 is configured by a log recording time 521, a device identification number 522, and various app-specific output information 523, and indicate an information log of the application A 362 as an example. In the application information log 520, every time an instruction to record log information is executed by the application A 362, one line's worth of the log recording time 521, the device identification number 522, and the app-specific output information 523 is added. In the case of FIG. 5C, the log recording time 521, the device identification number 522, and each piece of app-specific output information 523 are added in one line every time an instruction by the application A 362 to record the log information occurs. The log recording time 521 is a time at which an application, for example the application A 362, instructs the application information log 520 to record log information, and the recording is performed in Unix time in the present embodiment. The device identification number 522 is equivalent to the device identification number 502 and the device identification number 512. Each piece of app-specific output information 523 is content of information that the application A 362 instructed the application information log 520 to record, and designates a level (LogLevel) of a degree of importance of a log, a numeric value identifier (GroupId) of a particular application, and a character sequence (Message) of a particular application. Also, the application information log 520 is recorded in a CSV file format for each application by the application information obtainment unit 403 as "device identification number_file generation time_application name.csv".

<Log Record Initialization Processing>

Next, explanation is given regarding log output processing and log record processing of the log management application 361 the present embodiment using FIG. 6A, FIG. 8A and FIG. 8B. FIG. 6A and FIG. 6B are flowcharts of processing of the log management application 361 when the application PF 350 activates each application. A subject of execution is the CPU 204 in the present example. The log management application 361 is activated as a part of initialization processing, for example at the time of activation of the image processing apparatus 100, to record the logs thereof during operation of the image processing apparatus 100. Alternatively, it may be activated in accordance with an activation instruction associated with an administrator authority.

In FIG. 6A, in step S601, the log management application 361 which is activated by the application PF 350 performs reception registration processing of each event in relation to the class library group 351. By this registration, the log management application 361 becomes able to detect a notification of an occurrence of an event from the class library group 351 in the event reception unit 401 and then record it as log information of an event log at a time of processing execution in the control unit 331.

In step S602, the log management application 361 determines whether files of the setting information log 510 targeted for recording to the log management unit 400 by the setting information obtainment unit 402 exist. This determination is performed for each file of the setting information log 510 targeted for recording.

The log management application 361 generates a file of the setting information log 510 in relation to the log management unit 400 by the setting information obtainment unit 402 as step S603 if it is determined that there is a file of the setting information log 510 which is targeted for recording for which the determination of step S602 is that there is no file.

In step S604, the log management application 361 by the setting information obtainment unit 402 obtains setting information of each device via the class library group 351 and adds it to the respective setting information log 510 of the log management unit 400.

In step S605, the log management application 361 receives a notification of a registration process from an application through an application program interface (API, in some cases simply referred to as an interface.) of the application information obtainment unit 403 that is open to the application and registers this application as a target for obtaining application information. This processing is processing that is executed upon receiving the registration notification from the application, and is executed in accordance with the registration notification which is executed when, as respectively illustrated in FIG. 6B in the present embodiment, the application A 362 in step S611, or the application C 364 in step S631, is activated by the OSGi (registered trademark) 352 on the application PF 350. The processing of step S611 and step S631 can be executed at any timing if it is after an activation of the log management application 361.

In step S606, the log management application 361 receives a notification of registration processing through a function of the application file reception unit 404 by an application, and registers possessed files of the application designation as a target for collection. The processing is processing that is executed when a registration notification is received from an application, and is executed in accordance with registration processing which is executed when the application B 363 in step S621, or the application C 364 in step S632 illustrated in FIG. 6B in the present embodiment, is activated by the OSGi (registered trademark) 352 on the application PF 350. The processing of step S621 and step S632 can be executed at any timing if it is after an activation of the log management application 361.

In step S607 the log management application 361 starts log record processing. This processing is executed repeatedly until the log management application 361 is stopped by the OSGi (registered trademark) 352 on the application PF 350 and is explained in detail in FIG. 7A and FIG. 7B described later.

<Log Information Recording Processing>

FIG. 7A and FIG. 7B are flowcharts of log record processing of the log management application 361. In FIG. 7A, a log record processing start instruction of step S607 is received, and the log management application 361 determines whether there is a notification of an occurrence of each event from the event reception unit 401 as step S701. This determination is performed for each reception target event. If a reception target event is determined to be notified in step S701, the log management application 361 determines whether there is a file of the event log 500 targeted for recording to the log management unit 400 by the event reception unit 401 as step S702.

The log management application 361 generates a file of the event log 500 in relation to the log management unit 400 by the event reception unit 401 as step S703 if it is determined that there is an event log 500 which is targeted for recording for which there is no file by the determination of step S702.

In step S704, the log management application 361 adds log information of each event notified by the event reception unit 401 to the corresponding event log 500 of the log management unit 400.

In step S705, the log management application 361 determines whether or not it corresponds to a particular timing. This processing is performed in order to measure the timing at which the log management application 361, in later described step S706 to step S708, obtains each piece of setting information of a device by the setting information obtainment unit 402 to add them to the respective setting information log 510 of the log management unit 400. Also, the particular timing corresponds to a time of a log external output instruction notification from the log output control unit 405 of a fixed period and a time of application termination processing of the log management application 361.

When the particular timing is determined in step S705, the processing branches to step S706. The processing from step S706 to step S708 is equivalent processing to that of step S602 to step S604 which is previously described. However, a target log is a setting information log rather than an event log.

In step S709, the log management application 361 determines whether or not an instruction for log write processing through a function of the application information obtainment unit 403 by an application is received. This processing is processing which is executed upon reception of an instruction for the log write processing from an already registered application in step S605. Note, the log write processing instruction according to processing that depends on the respective application is made through a function of the application information obtainment unit 403 by the application A 362 in step S721 and by the application C 364 in step S731 as illustrated in FIG. 7B in the present embodiment. The determination of step S709 determines the existence or absence of these instructions. Information recorded in the log file by the log write instruction from an application will be referred to as application information or application information.

If it is determined in the determination of step S709 that an instruction for the log write processing was received from an already registered application, the log management application 361 determines by the application information obtainment unit 403 whether a file of the application information log 520 of the already registered application which performed the instruction for the log write processing exists in the log management unit 400 as step S710.

By the determination of step S710, if it is determined that a file of the application information log 520 corresponding to an already registered application for which the log write instruction is received in step S709 does not exist, the log management application 361 generates a file of the application information log 520 in relation to the log management unit 400 by the application information obtainment unit 403 as step S711.

In step S712, the log management application 361 adds log information of each application notified by the application information obtainment unit 403 to the corresponding application information log 520 of the log management unit 400.

In step S713, the log management application 361 determines whether or not an instruction for a log external output is notified by the log output control unit 405. This instruction may be received from the information processing apparatus 101 for example, and may be based on an input from the user input unit 202. Processing of the log external output, explained by step S714 and FIG. 8A and FIG. 8B described later, is performed in order to collectively output log files that the log collection unit 400 stored to the exterior via the log output control unit 405 by the log management application 361. Note, if a storage usage amount of the entirety of log files of the log collection unit 400 exceeds a constant value, the notification of an instruction for a log external output is executed at a timing of an output instruction or the like by a user operation via an operation screen that the log management application 361 has at a fixed period. Here, the operation screen that the log management application 361 has is not restricted to a configuration if an output instruction according to a user operation can be performed and may be an operation screen which displays on the UI display unit 203. Also, the log management application 361 has HTML data (not shown) which configures an operation screen, receives an HTTP Request from a Web browser (not shown) that the external information apparatus 101 possesses, and transmits the data via the communication unit 406. Also, an operation screen may be configured on a Web browser (not shown) that the external information apparatus 101 possesses.

If the instruction for a log external output is determined by the determination of step S713 to have been notified, the log management application 361 starts log external output processing as step S714. Details of the processing will be explained later in FIG. 8A and FIG. 8B.

<Processing for Log Collection from Application and External Output Processing>

FIG. 8A and FIG. 8B are sequence diagrams of log output processing of the log management application 361. This processing starts from step S714 in FIG. 7A.

In step S801, the log management application 361 makes an instruction for file collection of an application designated by the log collection unit 400 to the application file reception unit. Here, apps which become targets of the performance of the collection instruction are apps for which the log management application 361 received a registration instruction through a function of the application file reception unit 404 in step S606, and are the application B 363 and the application C 364 in the present embodiment. Also, here, regarding files which become targets of the performance of the collection instruction, the log management application 361 makes application designated files for which the registration processing instruction via a function of the application file reception unit 404 was performed in step S606.

In step S802, the log management application 361 determines whether an application designated file exists for the application B 363 by the application file reception unit 404.

If an application designated file for the application B 363 is determined to exist in step S802, the log management application 361 performs processing which copies the application designated file by the application file reception unit 404 as step S803. The copied file is stored in the storage area of the log management application 361.

In step S804, the log management application 361 performs processing which changes the name of the copied file by the log collection unit 400. The name change processing adds "device identification number_previous log obtainment time_current log obtainment time_" in a prefix of the copied file name. The device identification number is a device identification number of the image processing apparatus 100. By this unique file names can be guaranteed. Additionally, the time and the device that collected the log can be identified from the file name.

The processing from step S805 to step S808 is equivalent processing to that of step S801 to step S804. However, the application which is the target is the application C 364. Here, the file collection processing of the application B 363 and the application C 364 performed in step S801 to step S804 and step S805 to step S808 respectively is recited separately for the sake of explanation.

In step S809, the log management application 361 collects log information files stored in the storage area of the log management application 361 by the log collection unit 400 into a folder and performs compression processing. The folder name at this time, to uniquely name the folder name, is made to be "device identification number_current log transmission time" in order to identify the apparatus and the time. Then, the log management application 361 transfers the compressed file to the log output control unit 405 by the log collection unit 400. Not only are the log files collected in step S802 and in step S806 included, event logs or setting information logs recorded in the procedure of FIG. 7A are also included in the log information which is the target of compression and transmission at this time.

In step S810, the log management application 361 performs processing for external transmission of the compressed file by the log output control unit 405. In the present embodiment, the log management application 361 transmits an HTTP Request via the communication unit 406 by the log collection unit 400 to upload the compressed file to the information processing apparatus 101. However, there is no restriction in the configuration if there is an external device that is capable of accumulating log information.

In step S811, the information processing apparatus 101 obtains the compressed file from the HTTP Request received via the communication unit 300 and stores it to the log information storage 310. After this in the present embodiment, the external information apparatus 101 notifies an HTTP Response via the communication unit 300 to the log output control unit 405 of the log management application 361.

In step S812, the log management application 361 performs deletion of every log file within the storage area of the log management application 361 by the log output control unit 405.

In step S813, the log management application 361 performs a determination of whether the external output of the compressed file succeeded by the log output control unit 405. Here, in the determination processing, if there is an output to the external device by the USB for example, it is determined whether or not copying to the external device succeeded. In the present embodiment, this is determined by the HTTP Response according to step S812.

If it is determined in the determination of step S813 that the external output of the compressed file succeeded, the log management application 361 performs deletion of the compressed file within the storage area of the log management application 361 by the log output control unit 405 as step S814. If the external output fails in step S810, the processing of step S813 to step S814 is performed next time in order to output in combination with the compressed file whose transmission failed at a time of output according to step S810.

In step S815, the log management application 361 makes an instruction for a restart of the log record processing to the log collection unit 400 by the log output control unit 405. By this, the processing of step S714 of FIG. 7A ends and the flowchart of the log record processing described in FIG. 7A restarts.

By the above, in the first embodiment, device log information (the event log 500 and the setting information log 510) and application log information (the application information log 520 and an application file) can be obtained in one batch in an unchanged form. Alternatively, in relation to the application log information, each application becomes capable of collecting only log information as necessary, and log analysis processing of an operation verification or the like for an application by an analyst becomes easy.

Note, a configuration in which it is possible to designate a log which is a target for compression and transmission is also possible. In such a case, logs of types designated as a target, for example the application log collected in step S802 or in step S806, and the event log and setting information log recorded in the procedure of FIG. 7A, are compressed and transmitted, and deleted after that. Also, the transmission destination of the log information may be separately designated.

Second Embodiment

Next, explanation will be given for the second embodiment of the present invention. In the configuration of the first embodiment, application log information 502 and application files are collected in proportion to the existence of apps which use the function of the application information obtainment unit 403 of the log management application 361 and the function of the application file reception unit 404. At this time, when apps which write large amounts of data to the application log information 502 or to an application file exist, the data size becomes huge because this information is all outputted by the log management application 361. At this time, disk capacity of an output destination when an analyst recovers logs becomes unnecessarily stressed, and a management operation of a collection of the logs in which the logs become unrecoverable or the like is difficult.

The problem, which is caused by the large size of the log information as previously described, occurs because a restriction is not put on the use of the function of the application information obtainment unit 403 and the function of the application file reception unit 404 of the log management application 361. Specifically, predetermined authorization for the use of the function of the application information obtainment unit 403 and the function of the application file reception unit 404 is caused to be held, and thereby it is possible to avoid the problem by not providing usage permissions to an application that may perform inappropriate usage (in the case of the previously described example, an application that may output a large amount of data).

Accordingly in the second embodiment, the log management application 361 performs a change of processing to make only apps having an authority to use the function of the application information obtainment unit 403, the function of the application file reception unit 404, or both of these be the target of application information obtainment, the target of application file collection, or both of these by confirming the authority of an application when a function registration processing instruction is received from the application. Hereinafter, explanation will be given for the only differences from the first embodiment using FIG. 9A to FIG. 11B.

<Example of List Files on Apps of which Permission is Added>

FIG. 9A and FIG. 9B are a configuration diagrams of list files that the log management application 361 has which list apps which permit usage of the function of the log management application 361. The list files are configured by two files: an application information obtainment permission list 900 of FIG. 9A and an application file reception permission list 910 of FIG. 9B.

FIG. 9A is one example of a configuration diagram of the application information obtainment permission list 900. Application information indicating an application which permits usage of the function provided by the application information obtainment unit 403 is described and an application name 901, version information 902, and an application ID 903 are included in the application information obtainment permission list 900. This application information corresponds to items of a manifest file description of an application described later in FIG. 10A-FIG. 10C, and only an application which matches with this information is able to use the function that the application information obtainment unit 403 provides. In the present embodiment, only apps for which the information below is described in the manifest file are capable of using the function provided by the application information obtainment unit 403. Specifically, an application which is permitted as a target for which the log management application 361 obtains the application information is an application which has an application name "AppliA", version information "1.0", and an application ID "11111111-2222-3333-4444-555555555555". Also there is an application which has an application name "AppliC", version information "2.0", and an application ID "aaaaaaaa-bbbb-cccc-dddd-eeeeeeeeeeee".

FIG. 9B is one example of a configuration diagram of the application file reception permission list 910. Application information permitting usage of the function provided to the application file reception unit 404 is described and an application name 911, version information 912, and an application ID 913 are included in the application file reception permission list 910. This application information corresponds to items of a manifest file description of an application described later in FIG. 10A-FIG. 10C, and only an application which matches with this information is able to use the function that the application file reception unit 404 provides. In the present embodiment, only apps for which the information below is described in the manifest file are capable of using an API provided by the application file reception unit 404. Specifically, an application which is permitted as a target for which the log management application 361 obtains the application information is an application which has an application name "AppliB", version information "3.0", and an application ID "66666666-7777-8888-9999-000000000000".

<Examples of Manifest File>

FIG. 10A and FIG. 10B are examples of configuration diagrams of the configurations of apps which use the functions of the log management application 361 and a manifest file that the application PF 350 has. Here, the manifest file is something that records metadata for managing reference relations and a life cycle of the application according to the OSGi (registered trademark) 352 which configures the application PF 350, and is a file associated with a respective application. An application on the application PF 350 is a Jar file which has a manifest file in addition to class files configuring its functions.

FIG. 10A is one example of a configuration diagram of the configuration of an application and the manifest file of the application A 362. The application A 362 takes a format of a JAR file, has a class file group 1000 which configures its functions, and a manifest file 1001. The manifest file 1001 has an application name 1002, version information 1003, and an application ID 1004 of the application A 362 as metadata for functioning on the application PF 350. The application name 1002 indicates the name of the application, and corresponds to information described in the application name 901 of the application information obtainment permission list 900 and the application name 911 of the application file reception permission list 910. The version information 1003 indicates version information of the application, and corresponds to information described in the version information 902 of the application information obtainment permission list 900 and the version information 912 of the application file reception permission list 910. The application ID 1004 indicates the identifier of the application, and corresponds to information described in the application ID 903 of the application information obtainment permission list 900 and the application ID 913 of the application file reception permission list 910.

FIG. 10B is one example of a configuration diagram of the configuration of an application and the manifest file of the application B 363. The application B 363 takes a format of a JAR file, has a class file group 1010 which configures its functions, and a manifest file 1011. The manifest file 1011 has information corresponding to the manifest file 1001 and here, has data specific to the application B 363.

FIG. 10C is one example of a configuration diagram of the configuration of an application and the manifest file of the application C 364. The application C 364 takes a format of a JAR file, has a class file group 1020 which configures its functions, and a manifest file 1021. The manifest file 1021 is something that has information corresponding to that of the manifest file 1001 and the manifest file 1011, and here has data specific to the application C 364.

<Procedure at Time of Application Activation>

FIG. 11A is a flowchart of processing of the log management application 361 when the application PF 350 activates each application. Step S601 to step S604 and step S607 in FIG. 11A are processes that are equivalent to step S601 to step S604 and step S607 in FIG. 6A.

In step S1101, the log management application 361 receives a registration processing instruction through the function of the application information obtainment unit 403 by an application, and obtains the application name, the version information, and the application ID from the manifest file of this application. This processing is processing that is executed upon receiving the registration instruction from the application, and is executed when, as respectively illustrated in FIG. 11B in the present embodiment, the application A 362 in step S611, or the application C 364 in step S631, is activated by the OSGi (registered trademark) 352 on the application PF 350.

In step S1102, the log management application 361 determines whether the application name 901, the version information 902, and the application ID 903 described in the application information obtainment permission list 900 match with each piece of information of the application obtained in step S1101. In the present embodiment, the application name 1002, the version information 1003, the application ID 1004 of the application A 362, and an application name 1022, version information 1023, and an application ID 1024 of the application C 364 are used for the determination respectively.

If it is determined in the determination of step S1102 to be an application that is recorded in the application information obtainment permission list 900, the log management application 361 registers this application as a target for obtaining the application information as step S1103. The result of the determination in the present embodiment is that the application A 362 and the application C 364 are registered, and execution of a write instruction through the function of the application information obtainment unit 403 is permitted.

In step S1104, the log management application 361 receives a registration processing instruction through the function of the application file reception unit 404 by an application, and obtains the application name, the version information, and the application ID from the manifest file of this application. This processing is processing that is executed upon receiving the registration instruction from the application, and is executed when, as respectively illustrated in FIG. 11B in the present embodiment, the application B 363 in step S621, or the application C 364 in step S632, is activated by the OSGi (registered trademark) 352 on the application PF 350.

In step S1105, the log management application 361 determines whether the application name 911, the version information 912, and the application ID 913 described in the application file reception permission list 910 match with each piece of information of the application obtained in step S1104. In the present embodiment, an application name 1012, version information 1013, an application ID 1014 of the application B 363, and the application name 1022, the version information 1023, and the application ID 1024 of the application C 364 are used for the determination respectively.

If it is determined in the determination of step S1105 to be an application that is recorded in the application file reception permission list 910, the log management application 361 registers it as a target for collecting a possessed file designated by the application as step S1106. As the result of the determination in the present embodiment, the application B 363 is registered, and recovery processing (step S801 to step S804 in the sequence diagram of FIG. 8A) of files designated by the application B 363 is performed via the application file reception unit 404. Meanwhile, the result of the determination is that the application C 364 is not registered, and recovery processing (step S805 to step S808 in the sequence diagram of FIG. 8B) of files designated by the application C 364 is not performed via the application file reception unit 404.

By the above, in the second embodiment, the log management application 361 can avoid an operation influence by an application inappropriately using the function of the log management application 361 by targeting only an application having an authorization for obtainment of application information and for collection of application files. This leads to effort with respect to log collection being reduced, and an improvement in the ease of management operations when an analyst recovers the logs.

Note, in the present embodiment, the log management application 361 has a list file of usage permissions in order to determine apps which have authorization, and performs a comparison of the described information with manifest file information of the application. However, the configuration is not limited if there is an item by which it can be uniquely identified that the application is an application that has authority with respect to the log management application 361. For example, configuration may be taken such that an item for authorization determination is added to the manifest file, and the log management application 361 determines that an application has authority only if the application has that item.

Also, although configuration is such that permission is added to make log files recorded by obtaining application information from the application and application files collected from the application targets in the above described example, but it may be that just one of these is targeted.

Third Embodiment

Next, explanation will be given for a third embodiment of the present invention. In the configuration of the first embodiment, when an application which uses the function of the application file reception unit 404 of the log management application 361 adds log information to a file targeted for collection, the size of output data becomes larger because the log management application 361 outputs the information unchanged. Additionally, information preceding the added portion is the same information as the information at a time of the previous outputting, and a duplication occurs as log information. This not only stresses the disk capacity of the output destination when the analyst recovers logs, it also requires deletion of duplicate data when comparing data previously and currently outputted, and generates effort in the work of analyzing.

Accordingly, in the third embodiment, if an application file that the log management application 361 collected from an application is a text file, a change of processing to delete duplicate portions and then transmit is performed. Hereinafter, explanation will be given for the only differences from the first embodiment using FIG. 12A to FIG. 14.

Note, in the present embodiment, the log management application 361 additionally has a function (hereinafter, a "duplicate deletion function") in the application file reception unit 404 for instructing recording of files to the log collection unit 400 after having deleted duplication of files that an application possesses. Then, an application, for example the application C 364, makes an instruction for recording a log file that is recorded in the storage area managed by the application C 364 itself to the log collection unit 400 through the duplicate portions.

FIG. 12A is a flowchart of processing of the log management application 361 when the application PF 350 activates each application. The processing from step S601 to step S606 and step S607 is equivalent to the processing from step S601 to step S606 and step S607 in FIG. 6A.

In step S1201, the log management application 361 receives registration processing instruction through the duplicate deletion function of the application file reception unit 404 by an application, and registers a possessed file designated by the application as a target for collection. This processing is processing executed when a registration notification is received from an application, and is executed when, as is illustrated as in FIG. 12B in the present embodiment, the application C 364 is activated by the OSGi (registered trademark) 352 on the application PF 350 as step S1211.

<Processing for Log Collection from Application and External Output Processing>

FIG. 13A, FIG. 13B and FIG. 13C show a sequence diagram of log output processing of the log management application 361. This processing starts from step S714 in FIG. 7A.

Step S1301 executes the processing step S714 and step S801 to step S804 of the sequence of FIG. 8A. Specifically, by step S1300, the image processing apparatus 100 has a state that is equivalent to that after the execution of the processing step S804 of the sequence of FIG. 8A. The processing from step S805 to step S807 is equivalent processing to that of step S805 to step S807 in FIG. 8B.

In step S1302, the log management application 361 determines whether or not an application designated file according to the log collection unit 400 is a text file, and whether it is not the first time for processing which recovers an application designated file according to the log collection unit 400. Here, a text file indicates data represented only by a data sequence that can be converted into text such as a file having a file extension .txt, a CSV file, and a log file (.log).

If it is determined in the determination of step S1302 to be a text file or it is not the first time for processing, the log management application 361 starts full search processing of the application designated file by the log collection unit 400 as step S1303. This search is performed in descending order line-by-line from the tail line of an application designated file and is executed until the head line of the application designated file is reached or until determination of the processing of step 1306 described later becomes true.

In step S1304, the log management application 361 determines whether a line within the search in step S1303 by the log collection unit 400 matches with the final line of the log file collected previously. Here, the log file collected previously indicates a log file collected when execution of the log output processing is executed once prior by the log output processing that the log management application 361 is currently executing. Also, the final line of the log file is information recorded in later described step S1307 and in step S1311, and expresses that it is the final line that is determinable of the application designated file collected by the log collection unit 400 in the log output processing executed one time prior. The final line of the file is, for example, associated with the application designated file, stored by the log collection unit 400, and managed. Note, a line is a character sequence delimited by a line feed code for example.

If it is determined in step S1304 that a line within the search is matched, the log management application 361 performs a creation of files divided from the application designated file collected by the log collection unit 400 by lines before and after the hit in the search as step S1305. A hit line is already collected log information because the line is included in the first half portion file after division. Specifically, the log management application 361 creates a first half portion file which includes log information of the line searched by the log collection unit 400 and log information preceding that, and a second half portion file which includes subsequent log information but does not include log information of the line currently being searched.

In step 1306, the log management application 361 determines whether the size of the first half portion file and the size of the entirety of the application designated log file previously collected by the log collection unit 400 match. The size of the entirety of the previously collected application designated log file is information recorded in step S1308 and in step S1312 described later. The size information of the application designated log file is, for example, associated with the application designated file, stored by the log collection unit 400, and managed.

If the determination of step 1306 is that the size of the first half portion file matches the size of the entirety of previously collected application designated log file, the log management application 361 updates information of the final line of the previously collected log file by the log collection unit 400 to the information of the final line of the log file currently collected as step S1307. Also, the log management application 361 updates the size of the entirety of the previously collected log file by the log collection unit 400 to the size of the entirety of the currently collected log file as step S1308.

Additionally, the log management application 361 performs processing for overwriting the currently collected application designated file by the log collection unit 400 by information of the second half portion file as step S1309. Specifically, the application designated log file collected by the log collection unit 400 becomes something that has only log information recorded after the final line of the previously collected log file. After this processing, the log management application 361 interrupts the processing of step S1303 in relation to the log collection unit 400, and issues an instruction for performing processing after the processing loop, in other words step S1310.

In step S1310, it is determined whether it corresponds to either the log management application 361 performing processing for searching the entirety of the application designated file by the log collection unit 400 (specifically, whether it searched until the head of the file) or the processing for collecting the application designated file by the log collection unit 400 being performed for the first time. Here, the case where it is determined that processing for searching the entirety of the application designated file by the log collection unit 400 was performed indicates a case in which there was no match in the determination of step 1306 in the search processing of step S1303.

The log management application 361 executes step S1311 and step S1312 by the log collection unit 400 if it was determined in step S1310 that either processing for searching the entirety of the file was performed or it was the first time that collection processing for the application designated file by the log collection unit 400 was performed. These processing steps are processing equivalent to step S1307 and step S1308.

The processing of step S808 is processing equivalent to step S808 in FIG. 8B.

Step S1313 executes the processing from step S809 to step S815 of the sequence of FIG. 8B. Specifically, the log file after the update in the case when the collected log file is updated by the second half portion file in step S1312, or the collected log file itself if that is not the case, is compressed and transmitted to the external apparatus. Specifically, by step S1313, the image processing apparatus 100 has a state that is equivalent to that after the execution of the processing step S815 of the sequence of FIG. 8B.

A file 14a of FIG. 14 illustrated an example of description information of a file that that the application C 364 possesses and that the log management application 361 records by the log collection unit 400 via the application file reception unit 404. Also, FIG. 14 indicates transitions of description information of a file that the application C 364 possesses that the log management application 361 records to the log collection unit 400 by the application file reception unit 404 and generates, according to the sequence of FIG. 13A, FIG. 13B and FIG. 13C. Hereinafter, transitions of the configuration of the description information corresponding to the sequence of FIG. 13A, FIG. 13B and FIG. 13C will be explained.

The file 14a of FIG. 14 is an example of a log file that the log management application 361 collects from the application C 364 via the application file reception unit 404 and records in the log collection unit 400 when step S1310 of FIG. 13C is executed. The example illustrated here is a sequence of a first time that the log management application 361 collected the log file from the application C 364 by the application file reception unit 404 and recorded it in the log collection unit 400. Accordingly, step S1303 to step S1309 are not performed. Specifically, the log management application 361 records the file obtained from the application C 364 by the application file reception unit 404 in step S807 as a log file recorded to the log collection unit 400 without dividing. Also, in step S1311, a final line 1401 of file information of the file obtained by the application file reception unit 404 in step S807 is recorded as information of the final line of the previously collected log file. Additionally, in step S1312, the size of the file 1400 obtained by the application file reception unit 404 in step S807 is recorded as the size of the entirety of the previously collected log file.

A file 14b of FIG. 14 is an example of the log file that the log management application 361 collects from the application C 364 via the application file reception unit 404 and records in the log collection unit 400 when step S1303 of FIG. 13B is executed. This is an example of a second time of the sequence in which the log file that the log management application 361 collected from the application C 364 via the application file reception unit 404 is recorded to the log collection unit 400 in the present embodiment. Specifically, the log management application 361 by the log collection unit 400 searches the file collected by the application file reception unit 404 in step S807 in descending order line-by-line from a final line 1403 with the final line of the previously collected log file. At this time, in step S1304, when the final line of the previously collected log file matches with one line (line 1401 of the file 14b) of the currently collected log file, the log management application 361 divides the log file by the log collection unit 400 to create a first half portion file and a second half portion file as step S1305. In the first half portion file, log information 1400 of the file 14b is included and in the second half portion file, log information 1402 of the file 14b is included. Also, the log management application 361 executes step S1307 and step S1308 by the log collection unit 400 because it is determined in step 1306 that the first half portion file matches the size of the entirety of the previously collected log file. Specifically, the log management application 361 updates with the final line 1403 of the log file obtained by the application file reception unit 404 in step S807 the information of the final line of the log file recorded by collecting the previous time by the log collection unit 400. Furthermore, the size of the entirety of the previously collected log file is updated to the entire file size of the log file collected (the sum total for 1400 and 1402) by the application file reception unit 404 in step S807.

A file 14c of FIG. 14 is an example of log file that the log management application 361 recorded by the log collection unit 400 when step S1309 in the sequence of FIG. 13B is executed. The log management application 361 by the log collection unit 400 overwrites the log file of the application C 364 recorded via the application file reception unit 404 by the second half portion file created in step S1305. Accordingly, as in the file 14c of FIG. 14, the log management application 361 overwrites the file 14b of FIG. 14 via the log collection unit 400 with the file from which the portion duplicated in the log file previously recorded deleted from the entirety of the file, and transmits the file externally as the file that the application C 364 possesses in subsequent processing.

By the above, in the third embodiment, if an application file that the log management application 361 collected from an application is a text file, a duplicate portion is identified based on the contents of a file that is already transmitted externally, and in particular based on the end of the file and the file size. By transmitting after deleting duplicate portions, avoiding stress of the disk capacity of the destination and reducing effort for log analysis of the analyst becomes possible.

Note, the present invention is not limited to the embodiments disclosed specifically, and various variations and modifications are possible without deviating from the scope of the claims.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-218799, filed Nov. 6, 2015 which is hereby incorporated by reference herein in its entirety.

The invention claimed is:

1. An information processing apparatus having a platform that is an operation environment of an application, the information processing apparatus comprising:
a memory storing instructions related to a log management application that operates on the platform, and
a processor which executes the instructions causing the information processing apparatus to
when an event occurs within the information processing apparatus, obtain log information of the event via the platform and record a time managed by the information processing apparatus and the log information to a log file;
via an interface for an application of a first type that operates on the platform and is different to the log management application, when the application of the first type performs a writing of application information, record the time managed by the information processing apparatus and the written application information to a log file;
collect a log file that an application of a second type, that operates on the platform and is different to the log management application, manages; and
output in one batch the recorded log file and the collected log file, wherein a file name of the collected log file is changed using the time managed by the information processing apparatus.

2. The information processing apparatus according to claim 1, wherein the instructions further cause the information processing apparatus to delete a duplicate portion that was previously outputted from the collected log file and then output the log file.

3. The information processing apparatus according to claim 2, wherein the duplicate portion that was previously outputted is identified from the collected log file based on an end and a size of the duplicate portion that was previously output.

4. The information processing apparatus according to claim 1, the log information of the event is recorded to a log file obtained via the platform at a timing of at least either an event occurrence, an activation of the information processing apparatus, or a file output process.

5. The information processing apparatus according to claim 1, wherein the instructions further cause the information processing apparatus to obtain setting information of the information processing apparatus, and wherein the obtained setting information is also recorded as the log file.

6. The information processing apparatus according to claim 1, wherein application information written by the application of the first type which has a predetermined authority is recorded to the log file.

7. The information processing apparatus according to claim 1, wherein a log file that the application of the second type, which has a predetermined authority, manages is collected.

8. A method of processing information by a log management application operating on a platform that an information processing apparatus has, the method comprising:
when an event occurs within the information processing apparatus, obtaining log information of the event via the platform and recording a time managed by the information processing apparatus and the log information to a log file;
via an interface for an application of a first type that operates on the platform and is different to the log management application, when the application of the first type performs a writing of application information, recording the time managed by the information processing apparatus and the written application information to a log file;
collecting a log file that an application of a second type, that operates on the platform and is different to the log management application, manages; and
outputting in one batch the recorded log file and the collected log file, wherein a file name of the collected log file is changed using the time managed by the information processing apparatus.

9. A non-transitory computer readable medium recording a program for causing, by a computer having a platform that is an operation environment of an application, an information processing method according to a log management application operating on the platform to be executed, the method comprising:
when an event occurs within the information processing apparatus, obtaining log information of the event via the platform and recording a time managed by the information processing apparatus and the log information to a log file;
via an interface for an application of a first type that operates on the platform and is different to the log management application, when the application of the first type performs a writing of application information, recording the time managed by the information processing apparatus and the written application information to a log file;
collecting a log file that an application of a second type, that operates on the platform and is different to the log management application, manages; and
outputting in one batch the recorded log file and the collected log file, wherein a file name of the collected log file is changed using the time managed by the information processing apparatus.

* * * * *